US012759015B2

(12) United States Patent
Pankoke

(10) Patent No.: US 12,759,015 B2
(45) Date of Patent: Oct. 13, 2026

(54) METHOD AND DEVICE FOR PRODUCING A DECORATIVE SURFACE

(71) Applicant: Hymmen GmbH Maschinen- und Anlagenbau, Bielefeld (DE)

(72) Inventor: René Pankoke, Bielefeld (DE)

(73) Assignee: Hymmen GmbH Maschinen- und Anlagenbau, Bielefeld (DE)

( * ) Notice: Subject to any disclaimer, the term of this patent is extended or adjusted under 35 U.S.C. 154(b) by 269 days.

(21) Appl. No.: 16/865,356

(22) Filed: May 3, 2020

(65) Prior Publication Data

US 2020/0346395 A1 Nov. 5, 2020

(30) Foreign Application Priority Data

May 3, 2019 (DE) ..................... 10 2019 206 431.0
Nov. 12, 2019 (EP) .................................... 19208738

(51) Int. Cl.

| | |
|---|---|
| ***B05D 1/26*** | (2006.01) |
| ***B05B 1/02*** | (2006.01) |
| ***B05D 1/02*** | (2006.01) |
| ***B05D 3/00*** | (2006.01) |
| ***B24B 7/19*** | (2006.01) |
| ***B24B 21/04*** | (2006.01) |
| ***B24B 53/00*** | (2006.01) |
| ***B29C 59/02*** | (2006.01) |

(Continued)

(52) U.S. Cl.

CPC .................. *B05D 1/02* (2013.01); *B05B 1/02* (2013.01); *B05D 3/007* (2013.01); *B24B 7/19* (2013.01); *B24B 21/04* (2013.01); *B24B 53/003* (2013.01); *B29C 59/02* (2013.01); *B29C 59/16* (2013.01); *B41M 5/0041* (2013.01); *B44C 3/005* (2013.01); *B24B 29/005* (2013.01); *B29C 2059/027* (2013.01)

(58) Field of Classification Search

CPC .. B05D 1/02; B05D 3/007; B05B 1/02; B24B 7/19; B24B 21/04; B24B 53/003; B24B 29/005; B29C 59/02; B29C 59/16; B29C 2059/027; B29C 59/00; B29C 59/002; B29C 59/005; B29C 59/026; B41M 5/0041; B44C 3/005

See application file for complete search history.

(56) References Cited

U.S. PATENT DOCUMENTS

| | | | |
|---|---|---|---|
| 692,701 | A | 2/1902 | Burner |
| 3,308,227 | A | 3/1967 | Power et al. |

(Continued)

FOREIGN PATENT DOCUMENTS

| | | |
|---|---|---|
| AT | 387621 | 2/1989 |
| CA | 2568440 | 12/2005 |

(Continued)

OTHER PUBLICATIONS

Beuth "Paints and Varnishes—Determination of Gloss Value at 20°, 60° and 85° (ISO 2813:2014), German Version EN ISO 2813:2014", Beuth Publishing DIN, 2 P., Feb. 2015.

(Continued)

*Primary Examiner* — Ryan M Ochylski

(57) ABSTRACT

A method for producing a decorative surface is disclosed, wherein a manipulation medium applied to the surface is remove in a mechanical and/or contactless manner therefrom. Further, a device for performing the method is disclosed.

12 Claims, 9 Drawing Sheets

(51) Int. Cl.

| | |
|---|---|
| ***B29C 59/16*** | (2006.01) |
| ***B41M 5/00*** | (2006.01) |
| ***B44C 3/00*** | (2006.01) |
| *B24B 29/00* | (2006.01) |

(56) References Cited

U.S. PATENT DOCUMENTS

| | | | | |
|---|---|---|---|---|
| 3,580,768 | A | 5/1971 | Kukla | |
| 3,676,963 | A | 7/1972 | Rice et al. | |
| 4,439,480 | A | 3/1984 | Sachs et al. | |
| 4,513,299 | A | 4/1985 | Lee et al. | |
| 4,557,778 | A | 12/1985 | Held | |
| 4,668,765 | A | 5/1987 | Drawert et al. | |
| 5,178,928 | A | 1/1993 | Goto et al. | |
| 5,241,908 | A | 9/1993 | Tatcishi | |
| 5,306,783 | A | 4/1994 | Kirchgaessner et al. | |
| 5,358,737 | A | 10/1994 | Muees et al. | |
| 5,512,930 | A | 4/1996 | Brandt et al. | |
| 5,621,022 | A | 4/1997 | Jaeger et al. | |
| 5,779,779 | A | 7/1998 | Jolly | |
| 6,120,845 | A | 9/2000 | Pease | |
| 6,150,009 | A | 11/2000 | Stecker | |
| 6,193,361 | B1 | 2/2001 | Wen | |
| 6,354,686 | B1 | 3/2002 | Tanaka et al. | |
| 6,375,777 | B1 | 4/2002 | Sjolin et al. | |
| 6,589,357 | B1 * | 7/2003 | Wandres | B08B 5/02 134/13 |
| 6,621,087 | B1 | 9/2003 | Bisges et al. | |
| 6,830,305 | B1 | 12/2004 | Takizawa | |
| 6,927,014 | B1 | 8/2005 | Figov | |
| 7,001,016 | B2 | 2/2006 | Baxter et al. | |
| 9,006,680 | B2 | 4/2015 | Bettles et al. | |
| 9,266,382 | B2 | 2/2016 | Schacht | |
| 11,141,759 | B2 | 10/2021 | Pankoke | |
| 11,511,318 | B2 | 11/2022 | Pankoke | |
| 11,559,829 | B2 | 1/2023 | Chen et al. | |
| 2002/0018085 | A1 | 2/2002 | Asauchi et al. | |
| 2002/0061389 | A1 | 5/2002 | Brooker et al. | |
| 2003/0011651 | A1 | 1/2003 | Rupprecht et al. | |
| 2003/0152715 | A1 | 8/2003 | Beck et al. | |
| 2003/0167717 | A1 | 9/2003 | Garcia | |
| 2004/0028830 | A1 | 2/2004 | Bauer | |
| 2004/0048171 | A1 | 3/2004 | Grabher et al. | |
| 2004/0086678 | A1 | 5/2004 | Chen et al. | |
| 2004/0241416 | A1 | 12/2004 | Tian et al. | |
| 2005/0103182 | A1 | 5/2005 | Spurgeon | |
| 2005/0244571 | A1 | 11/2005 | Walheim et al. | |
| 2005/0255249 | A1 | 11/2005 | Schlatterbeck et al. | |
| 2006/0075917 | A1 | 4/2006 | Edwards | |
| 2006/0092254 | A1 | 5/2006 | Claes et al. | |
| 2006/0130421 | A1 | 6/2006 | Nollet | |
| 2006/0163371 | A1 | 7/2006 | Veil | |
| 2006/0209108 | A1 | 9/2006 | Hamazaki et al. | |
| 2006/0238554 | A1 | 10/2006 | Hosono et al. | |
| 2007/0076069 | A1 | 4/2007 | Edwards et al. | |
| 2007/0160790 | A1 | 7/2007 | Kaneko et al. | |
| 2007/0235410 | A1 | 10/2007 | Wong et al. | |
| 2007/0283648 | A1 | 12/2007 | Chen | |
| 2007/0296790 | A1 | 12/2007 | Nakazawa et al. | |
| 2008/0074482 | A1 | 3/2008 | Makuta et al. | |
| 2008/0081116 | A1 | 4/2008 | Makuta et al. | |
| 2008/0084466 | A1 | 4/2008 | Makuta et al. | |
| 2008/0176039 | A1 | 7/2008 | Chen et al. | |
| 2008/0187680 | A1 | 8/2008 | Kawakami et al. | |
| 2008/0241481 | A1 | 10/2008 | Tokumoto et al. | |
| 2008/0266371 | A1 | 10/2008 | Ma et al. | |
| 2008/0280028 | A1 | 11/2008 | Albrecht et al. | |
| 2009/0098339 | A1 | 4/2009 | Marccau | |
| 2009/0225143 | A1 | 9/2009 | Fukui | |
| 2009/0246365 | A1 | 10/2009 | Ito et al. | |
| 2010/0092688 | A1 * | 4/2010 | Serbutoviez | B29B 13/023 427/256 |
| 2011/0067731 | A1 | 3/2011 | Satoh et al. | |
| 2011/0157272 | A1 | 6/2011 | Ikehata et al. | |
| 2011/0200750 | A1 | 8/2011 | Meersseman et al. | |
| 2012/0015107 | A1 | 1/2012 | Schacht et al. | |
| 2012/0108148 | A1 | 5/2012 | Capka | |
| 2013/0065024 | A1 | 3/2013 | Aruga et al. | |
| 2013/0101796 | A1 | 4/2013 | Arzt et al. | |
| 2013/0182267 | A1 | 7/2013 | Zoltner et al. | |
| 2013/0286088 | A1 | 10/2013 | Ryberg et al. | |
| 2013/0286095 | A1 | 10/2013 | Wada et al. | |
| 2013/0341532 | A1 | 12/2013 | Lee et al. | |
| 2014/0017452 | A1 | 1/2014 | Pervan et al. | |
| 2014/0343687 | A1 | 11/2014 | Jennissen | |
| 2015/0079793 | A1 | 3/2015 | Hattori et al. | |
| 2016/0009932 | A1 | 1/2016 | Jang et al. | |
| 2016/0114619 | A1 | 4/2016 | Schacht et al. | |
| 2016/0205965 | A1 | 7/2016 | Elejalde et al. | |
| 2016/0215074 | A1 * | 7/2016 | Honma | C09D 11/101 |
| 2016/0238774 | A1 | 8/2016 | Koike et al. | |
| 2016/0297223 | A1 | 10/2016 | Langenscheidt et al. | |
| 2016/0332479 | A1 * | 11/2016 | Clement | B41J 2/01 |
| 2017/0081522 | A1 | 3/2017 | Adam et al. | |
| 2017/0333936 | A1 * | 11/2017 | Gibson | H01L 27/1292 |
| 2018/0056671 | A1 | 3/2018 | Boniface | |
| 2020/0016627 | A1 | 1/2020 | Pankoke | |
| 2020/0016629 | A1 | 1/2020 | Pankoke | |
| 2020/0023662 | A1 | 1/2020 | Pankoke | |
| 2020/0040799 | A1 | 2/2020 | Won | |
| 2020/0346246 | A1 | 11/2020 | Pankoke | |
| 2020/0346484 | A1 | 11/2020 | Pankoke | |
| 2020/0368777 | A1 | 11/2020 | Pankoke | |
| 2021/0268542 | A1 | 9/2021 | Pankoke | |
| 2021/0394232 | A1 | 12/2021 | Pankoke | |
| 2022/0379343 | A1 | 12/2022 | Pankoke | |
| 2022/0379344 | A1 | 12/2022 | Pankokc | |
| 2023/0144445 | A1 | 5/2023 | Pankokc | |

FOREIGN PATENT DOCUMENTS

| | | |
|---|---|---|
| CA | 2406991 | 1/2020 |
| CN | 1166386 | 12/1997 |
| CN | 1572380 | 2/2005 |
| CN | 1653390 | 8/2005 |
| CN | 101116987 | 2/2008 |
| CN | 101301821 | 11/2008 |
| CN | 101314981 | 12/2008 |
| CN | 101342844 | 1/2009 |
| CN | 102089088 | 6/2011 |
| CN | 102256806 | 11/2011 |
| CN | 102834188 | 12/2012 |
| CN | 103035983 | 4/2013 |
| CN | 103192656 | 7/2013 |
| CN | 103209770 | 7/2013 |
| CN | 103737464 | 4/2014 |
| CN | 104039368 | 9/2014 |
| CN | 105377521 | 3/2016 |
| CN | 105835589 | 8/2016 |
| CN | 207211033 | 4/2018 |
| CN | 109395925 | 3/2019 |
| DE | 3107798 | 9/1982 |
| DE | 3331391 | 3/1985 |
| DE | 69119743 | 1/1997 |
| DE | 19532819 | 3/1997 |
| DE | 19810455 | 9/1999 |
| DE | 69709984 | 9/2002 |
| DE | 60009141 | 10/2004 |
| DE | 60007560 | 12/2004 |
| DE | 69732819 | 4/2006 |
| DE | 10316695 | 12/2006 |
| DE | 102005043117 | 3/2007 |
| DE | 102006003798 | 7/2007 |
| DE | 10 006042063 | 3/2008 |
| DE | 102007019871 | 10/2008 |
| DE | 102007055053 | 5/2009 |
| DE | 102008024149 | 12/2009 |
| DE | 102009043812 | 3/2011 |
| DE | 102009044802 | 12/2011 |
| DE | 102009004482 | 3/2012 |
| DE | 102010052518 | 5/2012 |
| DE | 102015107259 | 11/2016 |
| DE | 102015110236 | 12/2016 |
| DE | 102015110268 | 12/2016 |

(56) References Cited

FOREIGN PATENT DOCUMENTS

| | | | |
|---|---|---|---|
| DE | 102016120878 | | 5/2017 |
| DE | 102009044802 | B4 | 11/2017 |
| DE | 102017113035 | | 12/2018 |
| DE | 4421559 | | 5/2020 |
| EP | 0019221 | | 11/1980 |
| EP | 0197267 | | 10/1986 |
| EP | 0210620 | | 2/1987 |
| EP | 0553421 | | 8/1993 |
| EP | 0372097 | | 6/1996 |
| EP | 0719647 | | 7/1996 |
| EP | 0810039 | | 12/1997 |
| EP | 0827838 | | 3/1998 |
| EP | 1101542 | | 5/2001 |
| EP | 1294578 | | 3/2003 |
| EP | 1384595 | | 1/2004 |
| EP | 1449667 | | 8/2004 |
| EP | 1454763 | | 9/2004 |
| EP | 1482085 | | 12/2004 |
| EP | 1652686 | | 5/2006 |
| EP | 1685974 | | 8/2006 |
| EP | 1728639 | | 12/2006 |
| EP | 1872959 | | 1/2008 |
| EP | 1902849 | A1 | 3/2008 |
| EP | 1911594 | | 4/2008 |
| EP | 1952998 | | 8/2008 |
| EP | 2042335 | | 4/2009 |
| EP | 2050514 | | 4/2009 |
| EP | 1872959 | B1 | 7/2009 |
| EP | 1290290 | | 1/2010 |
| EP | 2174772 | | 4/2010 |
| EP | 2181860 | | 5/2010 |
| EP | 2251205 | | 11/2010 |
| EP | 2280130 | | 2/2011 |
| EP | 2301762 | | 3/2011 |
| EP | 2308682 | | 4/2011 |
| EP | 2343169 | | 7/2011 |
| EP | 2418019 | | 2/2012 |
| EP | 2174772 | B1 | 5/2012 |
| EP | 1902849 | B1 | 8/2012 |
| EP | 2786807 | | 10/2014 |
| EP | 2857221 | | 4/2015 |
| EP | 2873535 | | 5/2015 |
| EP | 2873536 | | 5/2015 |
| EP | 2883712 | | 6/2015 |
| EP | 1290290 | B2 | 12/2015 |
| EP | 3090882 | | 11/2016 |
| EP | 3109056 | | 12/2016 |
| EP | 2555878 | | 12/2017 |
| EP | 3415316 | | 12/2018 |
| EP | 3415317 | | 12/2018 |
| EP | 3415318 | | 12/2018 |
| EP | 3415319 | | 12/2018 |
| EP | 3466677 | | 4/2019 |
| EP | 2313281 | | 9/2020 |
| EP | 3875248 | | 9/2021 |
| EP | 3875248 | A1 | 9/2021 |
| EP | 3995645 | | 5/2022 |
| ES | 370796 | | 1/1972 |
| ES | 1018178 | U | 1/1992 |
| ES | 2340456 | | 6/2010 |
| ES | 2349527 | | 1/2011 |
| ES | 2586981 | | 10/2016 |
| FR | 2936965 | | 4/2010 |
| FR | 2946959 | | 12/2010 |
| GB | 1405643 | | 9/1975 |
| JP | 59-169575 | | 9/1984 |
| JP | H05-278400 | | 10/1993 |
| JP | H06-115057 | | 4/1994 |
| JP | 06-270372 | | 9/1994 |
| JP | 09323434 | | 12/1997 |
| JP | 2003-285000 | | 10/2003 |
| JP | 2004-042548 | | 2/2004 |
| JP | 2004-134760 | | 4/2004 |
| JP | 2008-093910 | | 4/2008 |
| JP | 2008-246993 | | 10/2008 |
| JP | 2009-173003 | | 8/2009 |
| JP | 2010-069684 | | 4/2010 |
| JP | 2011-173091 | | 9/2011 |
| JP | 2015-54481 | | 3/2015 |
| JP | 2017-200740 | | 11/2017 |
| KR | 1020030083066 | | 10/2003 |
| KR | 1020060004828 | | 1/2006 |
| KR | 1020090066585 | | 6/2009 |
| KR | 2010-0120434 | | 11/2010 |
| KR | 20170045717 | A * | 4/2017 |
| RU | 2005132339 | | 4/2007 |
| WO | WO 90/15673 | | 12/1990 |
| WO | WO 96/08366 | | 3/1996 |
| WO | WO 98/08687 | | 3/1998 |
| WO | WO 99/12736 | | 3/1999 |
| WO | WO 99/67227 | | 12/1999 |
| WO | WO 00/30856 | | 6/2000 |
| WO | WO 01/47718 | | 7/2001 |
| WO | WO 02/08346 | | 1/2002 |
| WO | WO 02/33740 | | 4/2002 |
| WO | WO 02/068189 | | 9/2002 |
| WO | WO 2003/099456 | | 12/2003 |
| WO | WO 2005/116361 | | 12/2005 |
| WO | WO 2006/037644 | | 4/2006 |
| WO | WO 2006/080362 | | 8/2006 |
| WO | WO 2007/026172 | | 3/2007 |
| WO | WO 2007/088245 | | 8/2007 |
| WO | WO 2008/089021 | | 7/2008 |
| WO | WO 2008/110883 | | 9/2008 |
| WO | WO 2008/132126 | | 11/2008 |
| WO | WO 2009/111731 | | 9/2009 |
| WO | WO 2010/070485 | | 6/2010 |
| WO | WO 2010/079014 | | 7/2010 |
| WO | WO 2011/064075 | | 6/2011 |
| WO | WO 2011/126148 | | 10/2011 |
| WO | WO 2014/184418 | | 11/2014 |
| WO | WO 2015/078449 | | 6/2015 |
| WO | WO 2016/014617 | | 1/2016 |
| WO | WO 2016/142510 | | 9/2016 |
| WO | WO 2017/204361 | | 11/2017 |
| WO | WO 2018/069874 | | 4/2018 |
| WO | WO 2018/229170 | | 12/2018 |
| WO | 2020/039361 | A1 | 2/2020 |
| WO | WO 2020/039361 | | 2/2020 |

OTHER PUBLICATIONS

Emmler "Neue Entwicklungen bei der Industriellen Beschichtung von Holz und Holzwerkstoffen fuer Innenanwendungen", Technische Universitaet Dresden, Fakultaet Maschinenwese, Institut fuer Holz- und Papiertechnik, Tagungsband des 14. Holztechnologischen Kolloquiums, Dresden, Germany, Apr. 8-9, 2010, Schriftenreihe Holz- und Papiertechnik, 5: 120-125, Apr. 8, 2010.

Real Academia Espanola "Barniz", Diccionario de la Lengua Espanola—Edicion del Tricentanario, Real Academia Espanola, Definition, 3 P., Oct. 11, 2014.

Von Aufschnaiter "Industrial Ceramic Tile Manufacturing", Durst Phototechnik, Slideshow, p. 1-18, Nov. 3, 2014.

Wijshoff "The Dynamics of the Piezo Inkjet Printhead Operation", Physics Report, 491(4-5): 77-177, Available Online Mar. 31, 2010.

Ezzeldin et al. "Improving the Performance of an Inkjet Printhead Using Model Predictive Control," Preprints of the 18th IFAC World Congress, Sep. 2, 2011: 11544-11549.

"Barberan Industrial Solutions Since 1929", Barberan, English Transaltion, 10 P., Sep. 25, 2019.

"Darstellung Hilfslinie [Appearance Guideline]", 1 P.

"Dibujo Tec 1 and TEC 2", 1P.

"Widerspruchsbegruendung and it's machine-translation in English".

"Yupo Corporation, product information", retrieved from the internet on Feb. 25, 2022.

Restriction Official Action Dated Jun. 29, 2022 from US Patent and Trademark Office Re. U.S. Appl. No. 17/322,966. (7 pages).

Screenshot Benutzeroberflaeche.

Baldwin "Bridging the Path to a Silicon Future", IMI 17th Annual Ink Jet Printing Conference, 28 P., Feb. 7, 2008.

(56) References Cited

OTHER PUBLICATIONS

Barberan "Auszug Auftragsbestaetigung Brohl Master Curing Primer", Barberan, 3 P., Nov. 15, 2018.
Barberan "Auszug Webseite Wellpappenmaschinentyp", Barberan, 1 P.
Barberan "Barberan Screenshots", Barberan, 4 P., 2020.
Barberan "BIJ-INKJET Modular Digital Printing Systems", Barberan, 7 P., 2020.
Barberan "Catalogues", Barberan, 9 P., Mar. 31, 2020.
Barberan "First Barberan Jetmasters in Germany", Barberan, Machine Transaltion, Mar. 16, 2021.
Barberan "Jetmaster 360 Printing Software Manual", Barberan, 58 P., Dec. 5, 2017.
Barberan "Jetmaster 360", Barberan, English Translation and Design, 12 P., Sep. 6, 2021.
Barberan "Jetmaster Series A", Barberian, 1 P., 2020.
Barberan "Jetmaster Series Catalogue", Barberan, 1 P., 2020.
Barberan "Jetmaster Series Waveform Configuration File for Seiko RC1536 and 1024GS", Barberan, 1 P., Sep. 6, 2021.
Barberan "Screenshot User Interface", Barberan, 1 P.
Barberan. "Single Pass Jetmaster Series", Barbera, 5 P., 2020.
Boards of Appeal of the EPO "Beschwerdekammer/Communication of the Board of Appeal Jun. 19, 2019", Complaint file No. T0665/15-3.2.05,.
Boards of Appeal of the European Patent Office "Opinion Board of Appeal", Boards of Appeal of the European Patent Office, English Translation, 22 P., Jun. 19, 2019.
Dennis van Ijzerloo "Digital Printing Singlepass", DIPA Symposium, English Translation , 35 P., Aug. 7, 2019.
Dreiss Patentanw?lte PartG mbB "Action for Annulament of the DE Part of EP 2313281", Dreiss Patentanw?lte PartG mbB, English Translation, 72 P., Oct. 2020.
Dreiss Patentanwälte PartG mbB "Action for annulment of the DE part of EP 2 313 281.Reference number of the action for annulment: 3 Ni 34/20 (EP)", Dreiss Patentanwälte PartG mbB, English Translation, 36 P., Jul. 19, 2021.
Düsseldorf Regional Court "Urteil/Judgemenet" Düsseldorf Regional Court, 25.11.2021-12:20 0211 87565 1260 Regional Court Duesseldorf 3. 3/82, Nov. 25, 2021.
Eladio Jesús "Histogram Tool Description", Barberan, 4 P., Jun. 1, 2021.
Epson "Variable Sized Droplet Technology", Epson, 3 P., 2022.
European Standard "Chipboard Definition and classification German version EN 309", European Standard, English Translation, 11 P., Aug. 1992.
Federal Patent Court "Nichtigkeitsklage gegen den DE-Teil des EP 2 313 281 Aktenzeichen der Nichtigkeitsklage: 3 Ni 34/20 (EP) or Action for annulment of the DE part of EP 2 313 281 Reference number of the action for annulment: 3 Ni 34/20 (EP), In response to the defendant's statement of opposition of Apr. 9, 2021", Jul. 19, 2021.
Finsa "Catalogue", Finsa, 11 P., Mar. 4, 2022.
Finsa "Data Sheet MDF-Board", Finsa, 4 P., 2008.
Global Graphics "Global Graphics News Release ", Global Graphics, 3 P., Jul. 10, 2018.
Global Graphics "How to Mitigate Artifacts in High-Speed Inkjet Printing: a White Paper 4th Edition", Global Graphics, 16 P., Sep. 2019.
Jet Master Series "Barinsa—Waveform Report", Jet Master Series, 14 P., Sep. 2020.
Kruss "Client Application Report", Kruss, 12 P., Oct. 20, 2020.
Kruss "Determination of Droplet Sizes with DSAInkjet", Kruss, 4 P., Oct. 20, 2020.
Laminat Magazin "Himmen Prospect", Laminat Magazin, 2 P., 2009.
Li&Co AG "Micodur, Li&Co AG Confirmation of Purchase", Li&Co AG, 2 P., Sep. 8, 2021.
Lintec "Lintec Adhesives and Bonding", Lintec. 2 P., Mar. 2020.
Lintec "Lintec Product Information", Lintec, 4 P., 2020.
Meteor "MetCal for Print Calibration & Nozzle-Out Compensation", Meteor, 2 P., 2022.
Mimura et al. "Micro-Piezoelectric Head Technology of Color Inkjet Printer", International Conference on Digital Production Printing and Industrial Applications, 230-234 P., 2001.
Oji Tac Co.,Ltd. "Oji Tac", product information, Oji Tac Co.,Ltd., retrieved from the internet on Feb. 25, 2022.
PrintFlat "Corrects Inkjet Non-Uniformity Across the Web", PrintFlat, 7 P., Sep. 29, 2021.
Printing Industries of America "2019 Intertech Technology Award", Printing Industries of America, 34 P., 2019.
Seiko "508GS Greyscale Series Of Printheads", Seiko, 2 P., Sep. 18, 2020.
Seiko "Seiko, 508GS Greyscale Series Of Printheads, 2020", Seiko Holdings Group, Sep. 18, 2020.
SII Printek Inc. "Product Lineup—Inkjet Print Head—SII Printek Inc." retrieved from the internet on Mar. 8, 2021.
Toshiba "Brochure of CA3", Toshiba, 2 P., Jan. 12, 2022.
Toyo Ink Europe Specialty Chemicals D26 LIOJET UH021-YL-A10, Safety Data Sheet, Toyo Ink Europe Specialty Chemicals, Jan. 3, 2017.
Wallace et al. "Photo Realistic Ink Jet Printing ThroughDynamic Spot Size Control", Microfab, 9 P., Jun. 26, 2008.
Wikipedia "Archimedes Theorem about Sphere and Circular Cylinder", Wikipedia, English Translation, 7 P., Mar. 16, 2021.
Wikipedia "Corrugated Fiberboard", Wikipedia, 9 P., 2022.
WIkipedia "Haftone", Wikipedia, 9 P., Retrieved from the Internet on Oct. 4, 2021.
Wikipedia "Holz", Wikipedia, retrieved from the internet on Apr. 8, 2021.
Wikipedia "Lintec", Wikipedia, English Translation, 3 P., Feb. 25, 2022.
Wikipedia "Medium-density fibreboard", Wikipedia, retrived from the internet on Jul. 4, 2022.
Wikipedia "Melamine Resin", Wikipedia, retrieved from the internet on Jul. 7, 2022.
Wikipedia "Melaminharz", Wikipedia, retrieved from the internet on Mar. 2, 2022.
Wikipedia "Mitteldichte-Holzfaserplatte", Wikipedia, retrieved from the internet on Mar. 3, 2022.
Wikipedia "Paper", Wikipedia, retrieved from the internet on Jun. 24, 2022.
Wikipedia "Papier", Wikipedia, retrieved from the internet on Apr. 8, 2021.
Wikipedia "Satz des Archimedes ⊃ber Kugel und Kreiszylinder" with machine-translation, Wikipedia, retrived from the internet on Mar. 16, 2021.
Wikipedia "Syntetic Paper", Wikipedia, retrieved from the internet on Feb. 25, 2022.
Wikipedia "Wellpappe, Wikipedia", retrieved from the internet on Apr. 8, 2021.
Wikipedia "Wood, Wikipedia", retrieved from the internet on Jun. 24, 2022.
Wikipedia "Yupo (manufacturer)", wikipedia, retrieved from the internet on Feb. 25, 2022.
Xaar "Operating Parameters for XAAR 1001", Xaar, 7 P., 2008.
Xaar "Press Release Ligna 2009", Xaar, 6 P., May 18-22, 2009.
Xaar "User Manual(Handbuch) XAAR 1001", Xaar, 67 P., 2007.
Xaar—Technologies "The Wayback Machine", Xaar—Technologies, retrieved from the internet on Jun. 9, 2021.
Xaar Technology "Prospekt Xaar 1001", Xaar Technology.
Wikipedia "Ultraviolet", Wikipedia, the Free Encyclopedia, 29 P., Jun. 12, 2017.
Wikipedia "UV Curing", Wikipedia the Free Encyclopedia, 3 P. Apr. 12, 2017.
Third Party IDS Submission under 37 CFR 1.290 filed on Aug. 15, 2022 From the Re. U.S. Appl. No. 16/494,310.(2 Pages).
Third Party IDS Submission under 37 CFR 1.290 filed on Aug. 15, 2022 From the Re. U.S. Appl. No. 17/322,966.(2 Pages).
USPTO Communication Dated Aug. 17, 2022 RE Third-Party Submission From the Re. U.S. Appl. No. 16/494,310.(2 Pages).
USPTO Communication Dated Aug. 17, 2022 RE Third-Party Submission From the Re. U.S. Appl. No. 17/322,966.(2 Pages).

(56) References Cited

OTHER PUBLICATIONS

Restriction Official Action Dated Jul. 7, 2021 from the Re. U.S. Appl. No. 16/865,355. (6 pages).
Official Action Dated Oct. 18, 2021 from the Re. U.S. Appl. No. 16/865,355. (56 pages).
Official Action with Third-Party Submission Dated Sep. 10, 2021 From the Re. U.S. Appl. No. 16/494,308. (50 Pages).
Notice of Allowance Dated Jun. 7, 2022 from Re. U.S. Appl. No. 16/865,355. (9 pages).
Restriction Official Action Dated May 27, 2022 from the Re. U.S. Appl. No. 16/494,310. (10 pages).
Third Party IDS Submission under 37 CFR 1.290 filed on Aug. 3, 2022 From the US Patent and Trademark Office Re. U.S. Appl. No. 17/467,316.(2 Pages).
USPTO Communication Dated Aug. 8, 2022 RE Third-Party Submission From the US Patent and Trademark Office Re. U.S. Appl. No. 17/467,316.(2 Pages).
Final Official Action Dated Feb. 18, 2021 From the Re. U.S. Appl. No. 16/494,307. (21 Pages).
Third Party Submission under 37 CFR 1.290 filed on Jan. 29, 2021 From the Re. U.S. Appl. No. 16/494,308.(2 Pages).
Third Party Submission under 37 CFR 1.290 filed on Jan. 29, 2021 From the U.S. Appl. No. 16/494,309.(2 Pages).
Third-Party Submission Under 37 CFR 1.290 filed Jan. 29, 2021 From the Re. U.S. Appl. No. 16/494,310. (2 Pages).
USPTO Communication Dated Feb. 11, 2021 RE Third-Party Submission From the Re. U.S. Appl. No. 16/494,309.(2 Pages).
USPTO Communication Dated Feb. 3, 2021 RE Third-Party Submission From the Re. U.S. Appl. No. 16/494,308.(2 Pages).
USPTO Communication Dated Feb. 3, 2021 RE Third-Party Submission From the Re. U.S. Appl. No. 16/494,310.(2 Pages).
Wikipedia “Inkjet Printing”, Wikipedia, p. 1-15, Last Edited Aug. 31, 2020.
Official Action Dated Aug. 27, 2020 from the Re. U.S. Appl. No. 16/494,307. (26 pages).
Notice of Allowance Dated Oct. 3, 2022 from Re. U.S. Appl. No. 16/758,056. (38 pages).
Notice of Allowance Mar. 15, 2023 from the Re. U.S. Appl. No. 17/883,623. (15 pages).
Notice of Allowance Mar. 16, 2023 from the Re. U.S. Appl. No. 17/883,626. (12 pages).
Official Action Dated Mar. 9, 2023 from the Re. U.S. Appl. No. 17/467,316. (72 pages).
Official Action Dated Nov. 25, 2022 from the Re. U.S. Appl. No. 16/494,310. (99 pages).
Official Action Dated Dec. 5, 2022 from the Re. U.S. Appl. No. 17/883,623. (59 pages).
Official Action Dated Dec. 5, 2022 from the Re. U.S. Appl. No. 17/883,626. (62 pages).
Restriction Official Action Dated Apr. 26, 2023 from the Re. U.S. Appl. No. 18/092,347. (6 pages).
European Search Report and the European Search Opinion Dated Jun. 20, 2023 From the European Patent Office Re. Application No. 23159373.2. (17 Pages).
Official Action Dated May 31, 2023 from the Re. U.S. Appl. No. 16/494,310. (35 pages).
Merriam-Webster “Formation.” Merriam-Webster.com Dictionary, Merriam-Webster, https://www.merriam-webster.com/dictionary/formation. Accessed Jun. 1, 2023.
Official Action Dated Jul. 14, 2023 from the Re. U.S. Appl. No. 17/322,966. (100 pages).
Official Action Dated Jul. 25, 2023 from the Re. U.S. Appl. No. 18/092,347. (43 pages).
Notice of Allowance Dated Sep. 22, 2023 from Re. U.S. Appl. No. 16/494,310. (19 pages).
Official Action Dated Aug. 9, 2023 from the Re. U.S. Appl. No. 17/467,316. (45 pages).
Restriction Official Action Dated Aug. 8, 2023 from the Re. U.S. Appl. No. 16/865,358. (7 pages).
European Search Report and the European Search Opinion Dated Feb. 12, 2024 From the European Patent Office Re. Application No. 23210461.2. (12 Pages).
Official Action Dated Jan. 10, 2024 from the Re. U.S. Appl. No. 17/467,316. (7 pages).
Official Action Dated Jan. 16, 2024 from the Re. U.S. Appl. No. 17/322,966. (23 pages).
Advisory Action Before the Filing of An Appeal Brief Dated Nov. 21, 2023 from Re. U.S. Appl. No. 17/467,316. (4 pages).
Official Action Dated Dec. 20, 2023 from the Re. U.S. Appl. No. 18/092,347. (22 pages).
Official Action Dated Feb. 21, 2024 from the Re. U.S. Appl. No. 16/865,358. (131 pages).
Official Action Dated Jun. 17, 2024 from the Re. U.S. Appl. No. 17/322,966. (20 pages).
Notice of Allowance Dated Aug. 28, 2024 together with Interview Summary from the Re. U.S. Appl. No. 17/322,966. (10 pages).
Advisory Action Before the Filing of An Appeal Brief Dated Apr. 23, 2024 from Re. U.S. Appl. No. 17/322,966. (4 pages).
Advisory Action Before the Filing of An Appeal Brief Dated Mar. 29, 2024 from Re. U.S. Appl. No. 18/092,347. (10 pages).
Interview Summary Dated May 14, 2024 from the US Patent and Trademark Office Re. U.S. Appl. No. 17/322,966. (2 pages).
Notice of Allowance Dated May 15, 2024 from the US Patent and Trademark Office Re. U.S. Appl. No. 17/467,316. (24 pages).
Official Action Dated May 7, 2024 from the Re. U.S. Appl. No. 18/092,347. (23 pages).
Advisory Action Dated Sep. 16, 2024 together with Interview Summary Dated Sep. 12, 2024 From the Re. U.S. Appl. No. 16/865,358. (9 Pages).
Official Action Dated Sep. 24, 2024 from the Re. U.S. Appl. No. 18/092,347. (30 pages).
Official Action Dated Jul. 18, 2024 from Re. U.S. Appl. No. 16/865,358. (31 pages).
OIML “Factors Influencing Hardness Measurement”, OIML, https://www.oiml.org/en/files/pdf_g/g003-e83.pdf, 1-52, 1983.
Interview Summary Dated Mar. 20, 2025 from the Re. U.S. Appl. No. 16/865,358. (4 pages).
Official Action Dated Apr. 16, 2025 from the Re. U.S. Appl. No. 16/865,358. (31 Pages).
Official Action Dated Jun. 25, 2025 from the Re. U.S. Appl. No. 18/092,347. (28 pages).
Interview Summary Dated Jan. 22, 2025 from the Re. U.S. Appl. No. 18/092,347. (2 pages).
Official Action Dated Mar. 5, 2025 from the Re. U.S. Appl. No. 18/092,347. (25 pages).
Advisory Action Before the Filing of An Appeal Brief Dated Oct. 30, 2025 from Re. U.S. Appl. No. 18/092,347. (5 pages).
Interview Summary Dated Aug. 25, 2025 from the Re. U.S. Appl. No. 18/092,347. (6 pages).
Official Action Dated Dec. 8, 2021 from Re. U.S. Appl. No. 16/494,309. (62 pages).
Third Party IDS Submission under 37 CFR 1.290 filed on Oct. 15, 2021 From the Re. U.S. Appl. No. 16/865,355.(2 Pages).
Third Party Submission under 37 CFR 1.290 filed on Nov. 28, 2021 From the Re. U.S. Appl. No. 16/865,358.(3 Pages).
USPTO Communication Dated Dec. 1, 2021 RE Third-Party Submission From the Re. U.S. Appl. No. 16/865,358.(2 Pages).
USPTO Communication dated Oct. 25, 2021 RE Third Party Submission From the Re. U.S. Appl. No. 16/865,355.(2 Pages).
Restriction Official Action Dated Apr. 26, 2021 from the Re. U.S. Appl. No. 16/494,308. (6 pages).
Notice of Allowance Dated Aug. 24, 2022 from Re. U.S. Appl. No. 16/494,308. (26 pages).
Final Official Action Dated Feb. 7, 2022 from Re. U.S. Appl. No. 16/494,308. (17 pages).
Notice of Allowance Dated Apr. 20, 2022 from Re. U.S. Appl. No. 16/494,309. (16 pages).
Notice of Allowance Dated Apr. 21, 2022 from Re. U.S. Appl. No. 16/494,308. (16 pages).

(56) References Cited

OTHER PUBLICATIONS

Final Official Action Dated Mar. 18, 2022 from US Patent and Trademark Office Re. U.S. Appl. No. 16/865,355. (24 pages).

* cited by examiner

METHOD AND DEVICE FOR PRODUCING A DECORATIVE SURFACE

RELATED APPLICATIONS

This application claims the benefit of priority of German Patent Application No. 10 2019 206 431.0 filed on May 3, 2019, and European Patent Application No. 19 208 738.5 filed on Nov. 12, 2019, the contents of which are incorporated herein by reference in their entirety.

FIELD AND BACKGROUND OF THE INVENTION

The present invention relates to a method and a device for processing a surface of a workpiece, in particular, for producing a decorative surface.

For producing decorative surfaces in the industrial scale, the decorative surfaces having the aim of reproducing tile or wood surfaces, except from a layer forming the later surface, further manipulation media are also applied in order to manipulate the surface of the layer so that the decorative surface can be finally produced.

For example, EP 3 109 056 A1 describes a method for producing a structure on a surface. Thereto, a liquid layer is applied onto a workpiece. Subsequently, a manipulation medium in the form of droplets is sprayed onto the liquid layer, whereby, a displacement of the liquid layer occurs by the droplets so that recesses together forming a structure in the liquid layer are formed therein. Subsequently, this layer is fixed. In this way, a surface having a wood or tile look can be produced on the layer.

EP 3 415 316 A1 discloses a method in which a manipulation medium is applied onto the liquid layer in the form of droplets or fine droplets, wherein the manipulation medium has the characteristic to at least partially absorb electromagnetic radiation. When the liquid layer is irradiated, for example, by an Excimer laser, a polymerization at the surface of the liquid layer causing a micro folding occurs there, the micro folding having a matt surface as a result later. Thereby, the manipulation medium on the surface of the liquid layer at least partially absorbs the radiation so that, here, the polymerization occurs less strongly. As a result, these areas are glossier than the areas where no manipulation medium was located.

In the known methods, the temporarily applied manipulation medium has to be removed again after the performing of the method. Hereby, the problem is that the manipulation medium, in particular when it coalesces with the layer, has to be removed reliably and as completely as possible.

Therefore, it is an object of the present invention to solve this problem.

A further aim of this present invention is to enable a partial removal of the layer applied in advance, in particular, at areas where the manipulation medium has been applied.

SUMMARY OF THE INVENTION

This object is achieved by the subject-matters of the independent claims. Advantageous further developments are subject-matter of the subclaims.

Preferably, a method for producing a decorative surface on a workpiece is provided, the method having the following steps:

- applying a manipulation medium at least onto and/or into a part of a liquid layer located on the workpiece and/or at least on a part of the workpiece;
- removal of parts of the layer, wherein
- the removal takes place in a mechanical and/or contactless manner, in particular in a fluidic manner.

Thus, a manipulation medium is applied onto and/or into an at least partially liquid layer located on a workpiece. Alternatively or additionally, the manipulation medium can also be applied onto the workpiece itself. Thereby, the application of the manipulation medium takes place preferably on subareas or sections of the liquid layer and/or of the workpiece. In the further course of the method, parts of the layer are removed. The removal takes place preferably in a mechanical and/or contactless manner, in particular in a fluidic manner. If the manipulation medium is applied directly onto the workpiece, the liquid layer is preferably subsequently applied as described below. Preferably, the layer is dried together with the manipulation medium and/or at least partially cured before the removal of parts of the layer is executed so that, in particular, the viscosity of the layer increases.

These method steps can be provided in a method for producing a decorated surface on a workpiece. Nevertheless, between the execution of the removal of parts of the layer and the method steps executed before, there can be a temporal brake so that, in particular, the removal of parts of the layer can be an autonomous method.

Preferably, the parts of the layer which are removed also include parts of the manipulation medium located on or in the layer. In a specific embodiment, the manipulation medium is solely removed. If the manipulation medium is removed from the layer, this can take place partially so that a residue of the manipulation medium remains on and/or in the layer. However, the removal can also take place completely so that the manipulation medium is completely removed.

Thus, the removal of parts of the layer can involve that the material of the layer itself is removed. Alternatively, the manipulation medium can be solely removed from the layer. However, both, the material of the layer itself and material of the manipulation medium can be removed.

Preferably, the mechanical removal of parts of the layer is done by means of a removal device comprising a contact element being in contact with the surface of the layer, wherein, during removal, the surface of the layer and the contact element move relative to one another. Besides an opposed motion, a unidirectional or a relative motion in another manner can also occur.

Preferably, the contact element comprises a stationary and/or a moved brush and/or a grinding element and/or a plane element, wherein the contact element is provided moving or stationary with respect to the workpiece. Preferably, at least as moved brush, the brush comprises a disc brush and/or a roller brush and/or a brush band and/or, as stationary brush, a beam having a brush trimming.

The grinding element and/or plane element is preferably configured to skim parts of the layer once again in order to expose a manipulation medium enclosed therein.

Subsequently, the manipulation medium can be removed by means of the grinding element and/or the plane element or by means of other methods described here. The grinding element can preferably include a belt sander.

Generally, the contact element can comprise a stationary and/or a moved element. The contact element is further preferably designed as a cyclically working contact element, for example, comprising an abrasive belt or a roller brush. Thereby, the contact element preferably comprises portions which are not cyclically in contact with the layer during the removal. As described below, these portions can be cleaned at this moment.

Preferably, the contact element, in particular the brush, comprises textile and/or plastic fibers, in particular, nylon fibers, and/or metal, in particular steel, brass, or copper. Moreover, fibers including abrasives can be deployed. Hereby, preferably, it's about fibers with Anderton. These fibers or materials are preferably included in the bristles of the brush. Thus, in particular, configurations of the brush having metal or plastic bristles are possible.

The brush preferably comprises bristles having a diameter of 0.05 to 2 mm, preferably 0.1 to 1.2 mm, further preferably 0.2 to 0.7 mm, especially preferred 0.2 to 0.3 mm.

Preferably, the removal of parts of the layer includes suction of the parts by vacuum, preferably by means of a suction device, and/or heating of the layer and/or of the manipulation medium, preferably by supplying heat, particularly preferred for at least partial liquidation of the parts of the layer, in particular, of the manipulation medium. Preferably, the heat supply can take place by a heater or an IR radiator.

Preferably, a controlled and/or regulated motion of the contact element takes place. This can be, for example, the positioning of the contact element relative to the layer or also an adjustment of the number of revolutions or of the velocity of circulation of the disc brushes or the brush band.

While the contact element removes parts of the layer, clogging of the contact element by the removed material of the layer and/or of the manipulation medium can occur. In case of a brush, this means that the removed material settles in the bristles. As the case may be, a grinding element and/or a plane element can also be affected by the clogging. Therefore, a further step in which cleaning of the contact element is performed can be provided. The entire method for cleaning the contact element which is described below can also be executed independently from the method described in this application.

The cleaning can preferably take place by mechanically stripping the material at a stripping edge and/or also by means of suction by vacuum, e.g., by the above mentioned or a further suction device.

In order to reduce the viscosity of the material and/or of the manipulation medium and, thereby, to improve the detachability from the contact element, also here, a supply of heat to the contact element can be provided. The supply of heat can preferably be performed by a heater or by an IR radiator. The heater can be provided, e.g., in the contact element.

Alternatively or additionally, the cleaning of the contact element can include that the contact element is irradiated by radiation, in particular, electromagnetic radiation and/or electron radiation. Thereby, in particular, it is achieved, that the material and/or the manipulation medium settled on the contact element is at least partly or completely cured and, then, exists in a hard and brittle form. Preferably, by the hardening of the material, it easily breaks loose from the contact element, in particular, from the bristles, if a brush is provided. By mechanically stripping and/or sucking, this material can be removed from the contact element once again.

For the mechanical stripping, for example, a stripping edge at which the clogged contact element can be passed can be provided, whereby the manipulation medium and/or the removed part of the layer can be stripped. If, for example, the contact element comprises a brush, for this purpose, the bristles of the brush can come in contact with the stripping edge.

Except from the radiation hardening, further hardening methods can also be deployed in order to harden the material which has clogged the contact element. In general, various methods can be deployed to influence particularly the viscosity and/or the rigidity of material clogging the contact element. With contact elements cyclically working, it is important that the removal of parts of the layer as well as the cleaning of the contact element, therefore, the removal of these parts of the layer from the contact element, takes place within one cycle. Consequently, the manipulation of the viscosity, if it is performed in the method, has to take place within this cycle. Since the material clogging the contact element is, in particular, material of the layer and/or of the manipulation medium, therefore, each method causing a hardening or a change of the viscosity of these materials can be employed basically. Therefore, there is a hint to the possibilities described in this application.

In a preferred embodiment, the material and/or the manipulation medium comprises a ratio of more than 70% of acrylates cross-linking by the irradiation by electromagnetic radiation via the generation of chemical bonds and, therefore, the acrylates reduce the viscosity and, therefore, also the adhesiveness of the material and/or of the manipulation medium and increase the brittleness. Therefore, the above-described embodiment of the cleaning of the contact element is well suited to ensure an enduring and less failure-prone operation of an industrial facility producing according to the method of the invention.

In other embodiments, the material and/or the manipulation medium can also comprise other components or can be constituted thereof, as, e.g., an aqueous mixture with bonding agents, pigments and other additives.

Preferably, the removal of parts of the layer comprises a streaming to the surface of the layer and/or of the manipulation medium by a fluid flow, in particular, by an airflow. In this manner, in particular, the manipulation medium can be removed contactless which is preferably gentle for the surface of the layer. Therefore, also workpieces comprising elements which can be damaged by non-contactless methods, e.g., by the contact with an above-described brush, can be processed. For clarification, in FIG. 6, an embodiment of such workpiece is shown. Here, a workpiece 1 in the form of a pre-milled plank having a layer 2 applied to the workpiece surface is shown. Leftwards, the workpiece 1 comprises a connection element 1*a* which can engage in a slot of a further workpiece in the sense of a slot and key connection in order to join together several workpieces, e.g., as a flooring material in this way. According to the state of the art, instead of slot and key, today, so-called "click-profiles" which are, e.g., illustrated in EP 2 280 130 A2, are used for the installation of the floor planks. These areas or also the transition area of the connection element towards the layer 2, probably, should not needlessly be mechanically stressed during the production. Therefore, particularly here, a contactless removal of parts of the layer is preferable.

Furthermore, the method can preferably also be used for surfaces outside the floor covering, e.g., for furniture, wall, ceiling surfaces or also for external facade elements or further applications.

Preferably, the fluid flow impinges onto the surface of the layer and/or of the manipulation medium in an accordingly formed manner so that it extends across the entire width of the layer. The length of the extension of the impingement area of the fluid flow in direction of motion of the workpiece is preferably 1% to 20%, especially preferred 5% to 15%, in particular 10% to 12%, of the length of the extension of the fluid flow across the direction of motion. Thus, a fluid flow as thin as possible, in particular, in the sense of an “air blade” or an “air knife”, is preferably used. Alternatively, a liquid flow, particularly containing water, can also be used as fluid flow.

Preferably, the fluid flow impinges onto the surface of the layer and/or of the manipulation medium at an angle which is less than 45°, preferably less than 30°, especially preferred less than 15°. In case that, for example, only the manipulation medium shall be detached, in particular, in the case of application of merely a manipulation medium on the surface of the layer, a flat inflow is useful in order to achieve detachment from the layer. Depending on the situation, however, a steeper adjustment of the fluid flow can also be useful, in order to, e.g., blow out a manipulation medium which is included in recesses of the layer. Preferably, the angle is particularly cyclically changed during the execution of the method. The change can preferably also be depending on the currently detected amount of the removed manipulation medium. This amount is preferably detected by a detection device, for example, detecting the weight of the removed manipulation medium.

Alternatively or additionally, the fluid flow can impinge onto the surface of the layer also by so-called rotation nozzles. Thereby, with an entire diameter of the rotating nozzles of preferably 2-120 mm, especially preferred 5 to 50 mm, the rotation nozzles guiding the fluid flow to the surface rotate about a central axis. Thereby, a timely variable fluid flow is directed to the surface.

Preferably, the fluid flow further contains solid bodies enhancing the removal of parts of the layer. For example, sand or a comparable substance for additionally acting on the surface of the layer and/or the manipulation medium besides the fluid flow can be included here. The fluid flow can particularly also be used to remove, besides the manipulation medium, also material from the layer.

The solid bodies have a diameter of preferably 0.0001 to 1 mm, preferred 0.001 to 0.5 mm, especially preferred 0.005 to 0.3 mm.

Alternatively or additionally, the solid bodies are configured to liquefy or to evaporate after the impingement onto the layer and/or the manipulation medium. This can, for example, be achieved thereby that the solid bodies have the property to evaporate in the ambient temperature to which the workpiece including the layer is exposed. For example, this can be achieved by solid bodies of dry ice. These solid bodies of dry ice can particularly be applied onto the surface of the layer and/or of the manipulation medium by a dry ice beamer. Thereby, it is preferably achieved that the solid bodies do not remain on and/or in the layer. Thus, a subsequent removal of the solid bodies from the layer can be omitted.

Alternatively or additionally, during the generation, the solid bodies can be supposed to be supplied with a liquid, particularly with water. Thereby, an increase of the mass of the solid bodies is achieved so that the effect onto the surface of the layer and/or the manipulation medium is increased. The supply can take place, e.g., by moving the solid bodies by the fluid flow through a fog of the liquid. Thereby, the solid bodies act as cloud condensation nuclei at which the components of the fog inhere, whereby, finally, the supply of the solid bodies by the liquid takes place.

The solid bodies can particularly comprise sand grains, dry ice (solid $CO_2$), water ice (frozen water), sodium bicarbonate, or mixtures of these cited solid bodies.

Preferably, the method further comprises at least one of the following steps:

- applying a liquid layer onto at least a part of the surface of the workpiece and/or onto a manipulation medium applied onto the surface of the workpiece;
- curing the layer and/or the manipulation medium at least until partial curing.

In a specific embodiment, a method is provided the method comprising this procedure:

- applying a liquid layer onto at least a part of the surface of the workpiece and/or onto a manipulation medium applied onto the surface of the workpiece;
- applying the manipulation medium at least onto a part of the liquid layer and/or in the liquid layer and/or at least onto a part of the workpiece;
- curing the layer and/or the manipulation medium at least to partial curing;
- removal of the manipulation medium as described above.

The layer and/or the manipulation medium is preferably configured to be polymerizable by means of electromagnetic radiation.

In a further specific embodiment, a method comprising the following procedure is provided:

- applying a liquid layer onto at least a part of a surface of the workpiece;
- applying the manipulation medium onto at least a part of the liquid layer and/or into the liquid layer;
- curing the layer and/or the manipulation medium at least to the partial curing;
- removal of parts of the layer as described above.

In this last-named embodiment, by the last step (removal of parts of the layer), the applied manipulation medium can also be completely or partially removed commonly.

In each conceivable embodiment of the method, in particular, in the two just described specific embodiments, further method steps which can be provided before, between and also after the heretofore described method steps can be provided. Moreover, individual method steps can also be repeated.

Preferably, the manipulation medium comprises water. In a specific embodiment, the manipulation medium consists solely of water.

Preferably, the layer and/or the manipulation medium comprises acrylate containing material.

In the execution of the method, the workpiece is preferably moved in a direction of motion and, therefore, supplied successively to elements of a device. The elements are designed to execute the individual method steps. Alternatively or additionally, the elements of the device can be configured to move with respect to the workpiece.

For example, the method can be executed such that the layer is applied onto the surface of the workpiece in a liquid form. Subsequently, the manipulation medium is applied onto and/or into the layer. However, the method can also configured such that the manipulation medium is first applied onto the surface of the workpiece. Subsequently an application of the layer takes place. Here, the manipulation medium functions preferably as placeholder so that regions of the surface of the workpiece do not come in contact to the layer. If the manipulation medium is removed after the layer has been cured, these places remain as indentions or recesses in the layer. Of course, embodiments in which an application of the manipulation medium before as well as after the application of the layer takes place are conceivable. Also, a repeated repetition of the application of the layer and/or the manipulation medium is possible. If the manipulation medium is used as placeholder, the manipulation medium is preferably cured before the application of a liquid layer.

Before the application of the manipulation medium, a drying or curing of the liquid layer, preferably by electromagnetic radiation at a wavelength of 200 to 400 nm, takes place in order to particularly influence the viscosity of the liquid layer.

Preferably, the manipulation medium is applied onto parts of the liquid layer after the application of liquid layer.

Preferably, the manipulation medium and the at least partially liquid layer are irradiated by electromagnetic radiation, preferably at a wavelength of 180 to 400 nm.

Moreover, the curing can also be executed several times. For example, a first curing of the layer until the partial curing can be executed before the manipulation medium is applied. In this way, a desired viscosity of the layer can be pointedly adjusted so that, for example, a structure arising by the application of the manipulation medium endures for a certain time before the structure melts.

Preferably, the curing contains an irradiation of the layer and/or the manipulation medium by electromagnetic radiation, preferably by UV radiation and/or an irradiation by electron radiation.

The curing can preferably take place at the same time as the removal of parts of the layer. For example, the place of the layer which is just in contact with the contact element can be simultaneously irradiated with UV radiation causing the curing. The same is valid for all mechanical or contactless removal possibilities as described above.

The manipulation medium covering parts of the layer can cause that the covered part of the layer does not cure in the same extent as the exposed parts. Thereby, in particular, it concerns about the here described methods for curing. After the removal of parts of the layer, then, a final curing of the remaining layer and/or the remaining manipulation medium is executed.

Alternatively or additionally, the curing includes active and/or passive drying. By active drying, in the following, each kind of drying in which the liquid layer is dried by generating specific conditions is understood. Therefore, the liquid layer and/or the manipulation medium can particularly be dried by means of streaming to by a fluid, in particular by air, and/or by supplying heat, in particular by means of IR radiation or by use of a heater. Whereas, passive drying is preferably characterized in that the liquid layer and/or the manipulation medium cures for itself and without any further processing. This can, e.g., take place by a transport of the workpiece on a free track section of a conveyor transport and/or by depositing the workpiece.

Preferably, the curing by means of reaction takes place by, e.g., a two-component system which cures by a chemical reaction between the components of the layer and/or the manipulation medium within less than 30 minutes, preferably less than 5 minutes.

Preferably, the layer is cured after the application of the manipulation medium such that the viscosity of places of the layer at which the manipulation medium has been applied differs from the viscosity of the places where the manipulation medium has not been applied. Preferably, the difference corresponds to a factor of at least 1.5, especially preferred at least to a factor 2. Preferably, the viscosity at places where the manipulation medium has been applied is less than at places where the manipulation medium has not been applied. In the case of radiation curing, this is justified thereby that the layer underneath the manipulation medium has been, at least partially, shielded from the radiation, whereby the layer was exposed to a lesser amount of radiation and, thus, cured less.

Preferably, the curing of the layer until the final curing of the layer is executed after the removal of parts of the layer.

Preferably, the layer is at least partially cured before the application of the manipulation medium. If the manipulation medium has been applied before the liquid layer, the manipulation medium can also be at least partially cured, whereby preferably electromagnetic radiation, in particular UV radiation, is respectively used thereto. The curing is thereby preferably executed as described above.

Preferably, the application of the liquid layer onto the workpiece ensues by a digital and/or analog procedure. Particularly preferred, the application of the liquid layer ensues onto the entire surface of the workpiece. In an analog procedure, the application can take place by means of an application roller or of a casting machine generating a liquid carpet of the material of the layer, wherein the work piece is moved through the carpet. An application roller and a casting machine have the advantage that the layer can be applied onto an area as broad as possible at small efforts. In a digital procedure, the application ensues by means of a digital printing technique, e.g., by a digital printing head or a digital nozzle rod. Thereby, the layer can also be applied only onto partial areas of the workpiece.

Preferably, the application of the manipulation medium onto the workpiece and/or onto the liquid layer takes place by a digital procedure. Thereto, a digital printing technique, for example, with a digital printing head or a digital nozzle rod is deployed. Thereby, the manipulation medium to be applied can be deployed especially economically and precisely. However, an analog technique, as, e.g., a casting device, is also conceivable.

Preferably, the application of the manipulation medium includes an application of the manipulation medium in the form of droplets and/or in the form of fine droplets. The application of the manipulation medium in form of droplets onto the layer preferably ensues such that the droplet speed and/or the droplet volume is controlled such that recesses are brought into the layer by the droplets, wherein the recesses preferably have a depth of preferably 2 μm to 100 μm, especially preferred from 3 μm to 50 μm.

The emission of the fine droplets is preferably controlled such that their momentum when impinging onto the surface of the liquid layer is not sufficient for at least partially overcoming the surface tension and/or the viscosity forces of the liquid layer so that the fine droplets preferably come to lie on the surface of the liquid layer. Especially preferred, the manipulation medium is applied onto the surface of the layer in the form of fine droplets as fog so that this fog forms particularly closed areas covering the surface of the layer.

Thereby, the fine droplets particularly comprise a volume from 0.1 pl to 1 pl, preferably from 0.3 to 0.8 pl, especially preferred from 0.5 to 0.6 pl.

Thereby, the droplets particularly comprise a volume from 1 pl to 80 pl, preferably from 3 pl to 12 pl, especially preferred from 5 pl to 10 pl.

The speed of the droplets and/or of the fine droplets is particularly between 0.5 m/s and 12 m/s, preferably between 3 m/s and 7 m/s, especially preferred between 5 m/s and 6 m/s.

During the application of the manipulation medium, the speed and/or the volume of the droplets and/or of the fine droplets can be varied.

The emission of the droplets is preferably controlled such that its momentum when impinging onto the surface of the liquid layer is sufficient for at least partially overcoming the surface tension and/or the viscosity forces of the liquid layer so that a displacement of the liquid layer ensues by the droplets, whereby recesses and, in particular, a structure of 10 to 15 μm difference in height can be brought in.

Preferably, the manipulation medium is configured to at least partially absorb incident electromagnetic radiation, whereby, preferably at least 10%, especially preferred at least 30%, in particular at least 50%, of the incident electromagnetic radiation is absorbed. In this way, it is possible to shield the surface of the layer at least partially from the electromagnetic radiation so that, in particular, during curing of the liquid layer, the electromagnetic radiation acts differently strong on the surface of the layer. Compared to the exposed spots, the electromagnetic radiation acts weaker at the places of the layer covered by the manipulation medium. Therefore, if, e.g., a wavelength of less than 300 nm, preferable less than 250 nm, especially preferred, less than 200 nm, is used, a micro folding at the surface of the layer can be generated, the micro folding turning out weaker at the places of the layer covered by the manipulation medium than at the exposed places. As a result, the places which not have been covered will appear more matt than the places which have been covered by the manipulation medium during this irradiation. Specifically, a wavelength of 185 nm is used here. The irradiation preferably takes place in a protective gas atmosphere, in particular, in a $N_2$ atmosphere.

Preferably, the manipulation medium and the layer are configured not to coalesce to each other during the curing. Thereby, the particularly complete removal of the manipulation medium is considerably facilitated.

Further, preferably, a device for performing the above mentioned methods is provided, the device comprising:

- a transport device configured to transport a workpiece to further elements of the device and/or to move at least a further element of the device to the workpiece; and
- as further element, an application device, in particular, comprising a digital printing device configured to apply a manipulation medium onto an at least partially liquid layer located on the workpiece and/or onto a surface on the workpiece;
- preferably as further element, a curing device configured to cure the liquid layer and/or the manipulation medium;
- as further element, a removal device configured to remove parts of the layer in a mechanical and/or fluidic manner, wherein
- the device further comprises a control means configured to control the transport device and the further elements of the device in order to perform one of the methods as described above.

The device can particularly comprise device features or configurations described above in the elucidation of the method.

Preferably, the transport device comprises a belt transport device on which the workpiece can be transported to the further elements of the device. Alternatively or additionally, it can also be configured such that at least one of the elements of the device is moved to the workpiece.

Preferably, the curing device comprises a radiation source for electromagnetic radiation, wherein the wavelength of the emitted radiation is preferably variable. Especially preferable, the emitted radiation is UV radiation.

Preferably, the curing device comprises a blower configured to blow a fluid flow, particularly an airflow, onto the layer and/or onto the manipulation medium in order to perform drying of the layer and/or the manipulation medium.

Preferably, the removal device for mechanical removal comprises a contact element configured to come in contact with the surface of the layer and/or the manipulation medium in order to remove parts of the layer.

Preferably, the removal device comprises a nozzle configured to let flow a fluid flow, preferably, an airflow, onto the surface of the layer in order to remove parts of the layer, in particular, the manipulation medium. The fluid flow is preferably configured as described above. The nozzle is preferably designed as being movable in order to be able to vary the angle at which the fluid flow impinges onto the surface of the layer.

Preferably, the removal device comprises a suction device designed such that the manipulation medium is sucked from the layer by means of vacuum and/or already loosed parts of the layer, in particular, the manipulation medium, are sucked up. Preferably, the suction device comprises a suction nozzle which is especially particularly designed as being movable and which can be approached to the surface of the layer in order to suck up the manipulation medium.

Preferably, the device comprises a chamber in which at least the nozzle and/or the suction nozzle is provided in order to collect loosed parts of the manipulation medium.

Preferably, the removal device comprises a heating device configured to heat the surface of the layer and/or the manipulation medium. Alternatively or additionally, the heating device can be configured to transmit heat to the contact element in order to prevent or reduce clogging of the contact element as described above. It can also be provided that the contact element comprises the heating device. Preferably, the heating device comprises an IR radiator.

Preferably, the contact element comprises a stationary and/or a movable brush and/or a grinding element and/or a plane element. Preferably, the contact element, particularly the brush, comprises textile and/or plastic fibers, particularly nylon fibers, and/or metal, in particular steel, brass, or copper. Further, the contact element can comprise fibers including a grinding means.

BRIEF DESCRIPTION OF THE SEVERAL VIEWS OF THE DRAWINGS

Below, the invention is described in detail by means of preferred embodiments and by means of the attached drawings. In particular.

DESCRIPTION OF SPECIFIC EMBODIMENTS OF THE INVENTION

Figure 1:
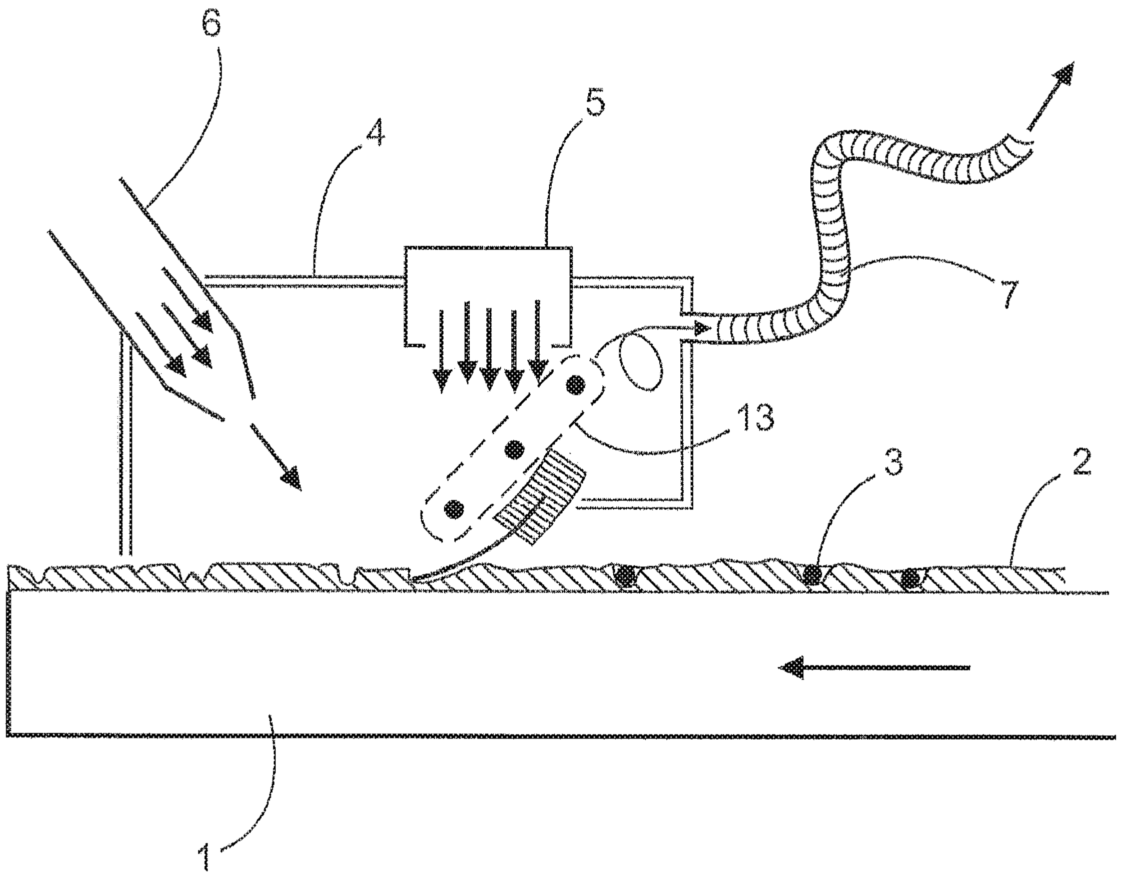
FIG. 1 shows an embodiment of the invention in which the removal of parts of the layer takes place in a fluidic manner.

FIG. 1 shows an embodiment of the invention in which the removal of parts of the layer, here, in particular, of the manipulation medium, takes place in a fluidic manner.

A flat workpiece 1, in the drawing, moving from the right to the left, is shown. The workpiece 1 is covered by a liquid layer 2 which forms the surface of the workpiece 1 after the complete curing. Into the liquid layer 2, a manipulation medium 3 has been brought in at some places in order to displace the liquid layer 2. The workpiece 1 is moved into a chamber 4 by a transport device of a device according to the invention. The chamber 4 comprises, in the direction of motion, first, a curing device 5 comprising an UV radiation source emitting UV radiation onto the liquid layer 2 in order to cure it so that the viscosity of the layer 2 is changed. The UV radiation comprises thereby a wavelength of 200 to 400 nm. Subsequently, the workpiece 1 is fed to a nozzle 6 emitting a fluid flow at an angle with respect to the surface of the layer 2 against the direction of motion. Thereby, the angle is maximum 45° or less. Preferably, an adaption of the angle between 0° and 45° takes place. This adaption can be done, for example, depending on the removed manipulation medium.

By the nozzle 6, the fluid flow is configured such that it exerts a flow pressure onto the manipulation medium 3 which is as high as the manipulation medium 3 loosens as parts 13 of the layer 2 from the layer 2.

By the pressure of the fluid flow, subsequently, the loosed parts 13 of the manipulation medium 3 (framed in a dotted manner) are urged to the right where they are collected by a suction device 7 by vacuum and are removed from the chamber 4.

In one embodiment, the fluid flow is configured such that it extends across the entire width of the workpiece 1, i.e., in a direction of extension of the workpiece 1 perpendicular to the drawing plane. In this way, it is ensured that all parts of the manipulation medium 3 are covered by the fluid flow which, in particular, upon chaotically or irregularly inserted manipulation medium 3, obviates the need of a targeted flow to individual regions of the surface of the layer 2.

As fluid, a liquid or a gaseous substance is deployed. Specifically, also, water and/or air can be deployed as the fluid.

Figure 2:
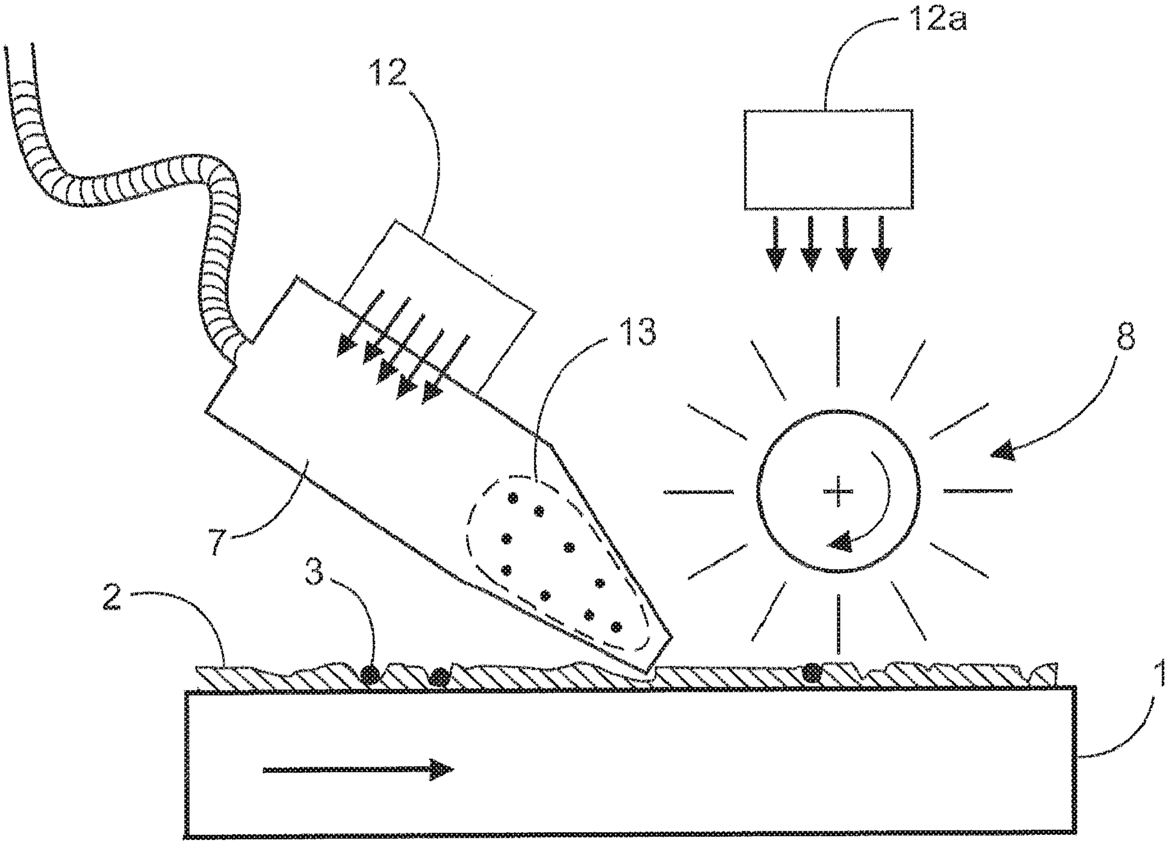
FIG. 2 shows an embodiment of the invention in which the removal of the parts of the layer takes place in a mechanical manner.

FIG. 2 shows an embodiment of the invention, in which the removal of parts of the layer takes place in a mechanical manner.

A flat workpiece 1, in the drawing, moving from the right to the left, is shown. The workpiece 1 is covered by a liquid layer 2 which forms the surface of the workpiece 1 after the complete curing. Into the liquid layer 2, at some places, a manipulation medium 3 has been brought in in order to displace the liquid layer 2. The workpiece 1 is, for example, moved by a transport device of a device according to the invention.

In the direction of motion, first, a suction device 7 configured to suck up loosed parts 13 of the layer 2, in particular, the loosed manipulation medium 3, by means of vacuum is arranged. Thereto, the suction nozzle of the suction device 7 is aligned close to the surface of the layer 2. After the suction device 7, a brush 8 designed as roller brush is arranged. This brush 8 extends perpendicular to the drawing plane across the direction of motion of the workpiece 1. In this embodiment, the roller brush is rotated opposite to the direction of motion of the workpiece 1. The suction device 7 further comprises a radiation source 12. This radiation source 12 is configured to emit electromagnetic radiation, as UV radiation, for curing the sucked-up parts 13 of the layer 2, whereby, curing of the parts 13 takes place within the suction device 7 so that there is no risk for adhering in and clogging the suction device 7.

By the contact of the bristles of the brush 8, parts 13 of the layer 2, in particular, the manipulation medium 3, are brushed out of the layer 2 and conveyed in direction of the suction device 7. This suction device 7 collects the loosed parts 13 (framed in a dotted manner).

Finally, a further radiation source **12*a* configured to emit electromagnetic radiation, particularly UV radiation, to the brush 8 in order to cure and/or embrittle the material of parts of the layer 2** adhering there is shown.

Figure 3:
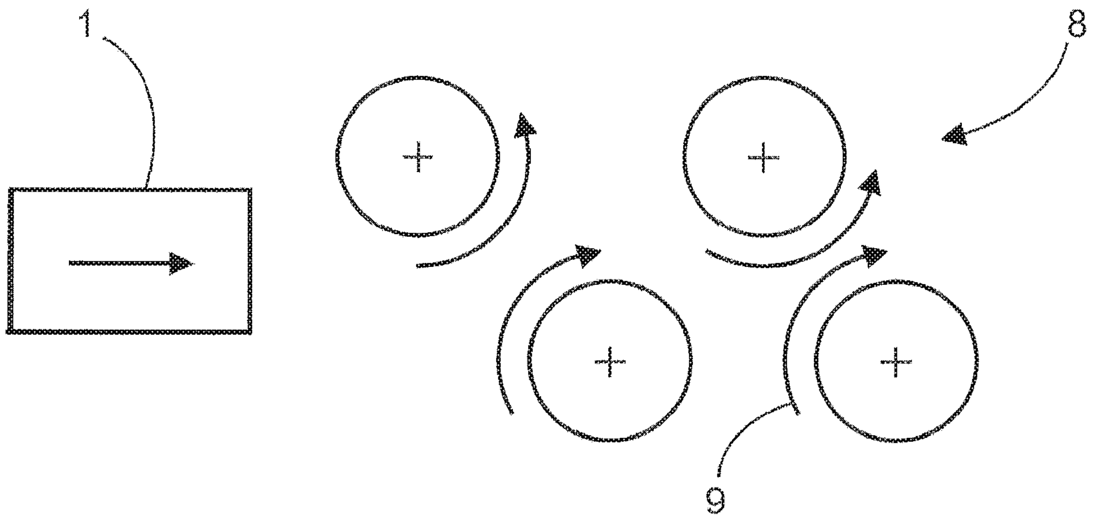
FIG. 3 shows an embodiment of brushes for mechanical removal of part of the layer.

FIG. 3 shows an embodiment of brushes for mechanical removal of parts of the layer.

A workpiece 1 as well as several brushes 8 are shown in a plan view. The workpiece 1 is moved through under the brushes 8 from the left to the right. The brushes 8 are here designed as disc brushes rotating in the shown directions of rotation around a respective axis. When the workpiece 1 on which a layer with or without a manipulation medium (both is not shown) is located is moved through under the brushes 8, thus, parts of the layer, in particular, the manipulation medium, are mechanically removed by a contact with the brushes 8 relatively moving with respect to the workpiece 1.

By the rotating motion of the brushes 8 additionally to the relative motion between the workpiece 1 and the brushes 8, a further relative motion component is added so that the force with which the bristles of the brushes 8 act onto the layer or the manipulation medium is enlarged.

Figure 4:
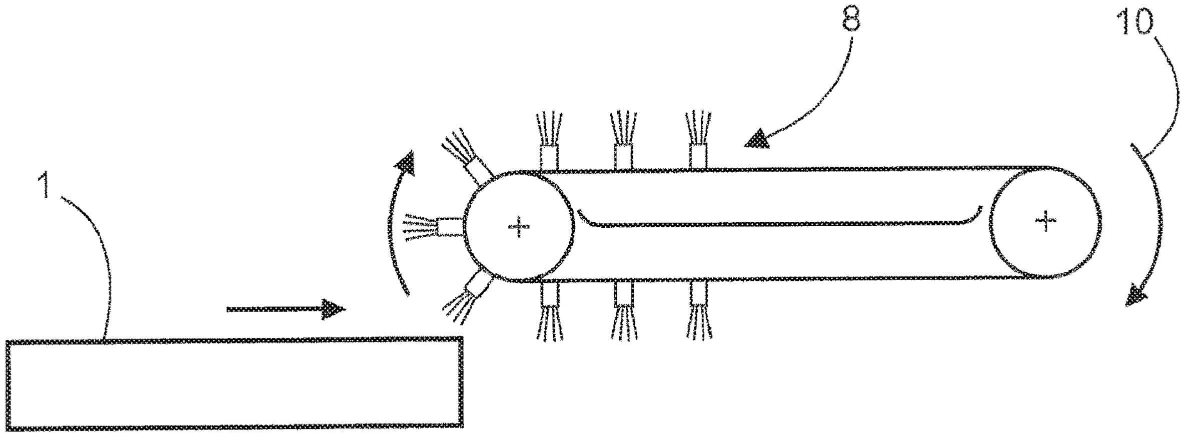
FIG. 4 shows a further embodiment of brushes for mechanical removal of parts of the layer.

FIG. 4 shows a further embodiment of brushes for mechanically removing parts of the layer, in particular the manipulation medium.

A workpiece 1 having a layer with or without a manipulation medium (both is not shown) as well as a brush band are shown in the side view. The workpiece 1 is moved from the left to the right. The brush band is trimmed with several brushes 8.

The brush band cyclicality circulates in the shown circulation direction so that the brushes 8 which are located at the underside of the brush band at the moment move from the right to the left opposite to the motion of the workpiece 1. In this way, additionally to the relative motion between the workpiece 1 and the brushes 8, a further relative motion component is added due to the motion of the workpiece 1 from the left to the right so that the force by which the bristles of the brushes 8 act onto the layer or the manipulation medium is enlarged.

Figure 5:
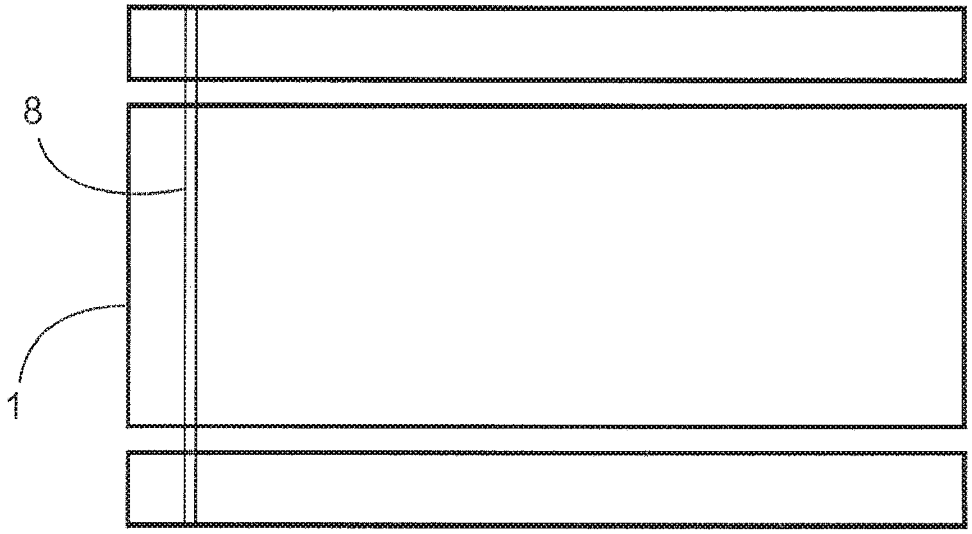
FIG. 5 shows a further embodiment of brushes for mechanical removal of parts of the layer.
Figure 6:
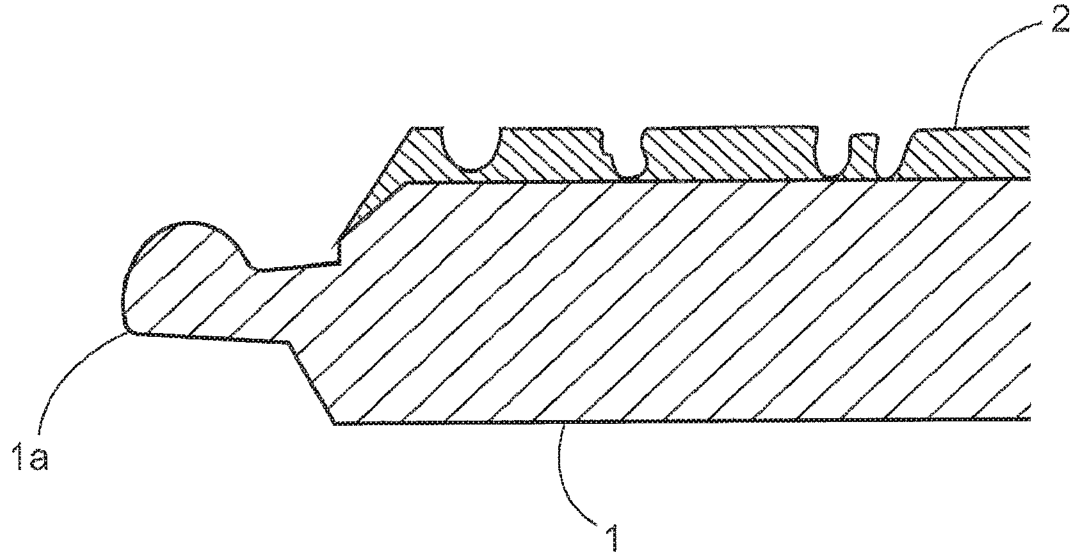
FIG. 6 shows a workpiece in the form of a pre-milled plank with an applied layer.

FIG. 5 shows a further embodiment of brushes for mechanical removal of parts of the layer, in particular, of the manipulation medium.

A workpiece 1 which is moved through under a beam 11 from the left to the right, wherein the beam 11 comprises, on its side facing the workpiece 1, brushes which can come in contact with the workpiece 1 or with the layer and/or the manipulation medium thereon (both is not shown). Thereby, the beam 11 extends across the entire extension of the workpiece 1, therefore, from above to below in the drawing.

Figure 7:
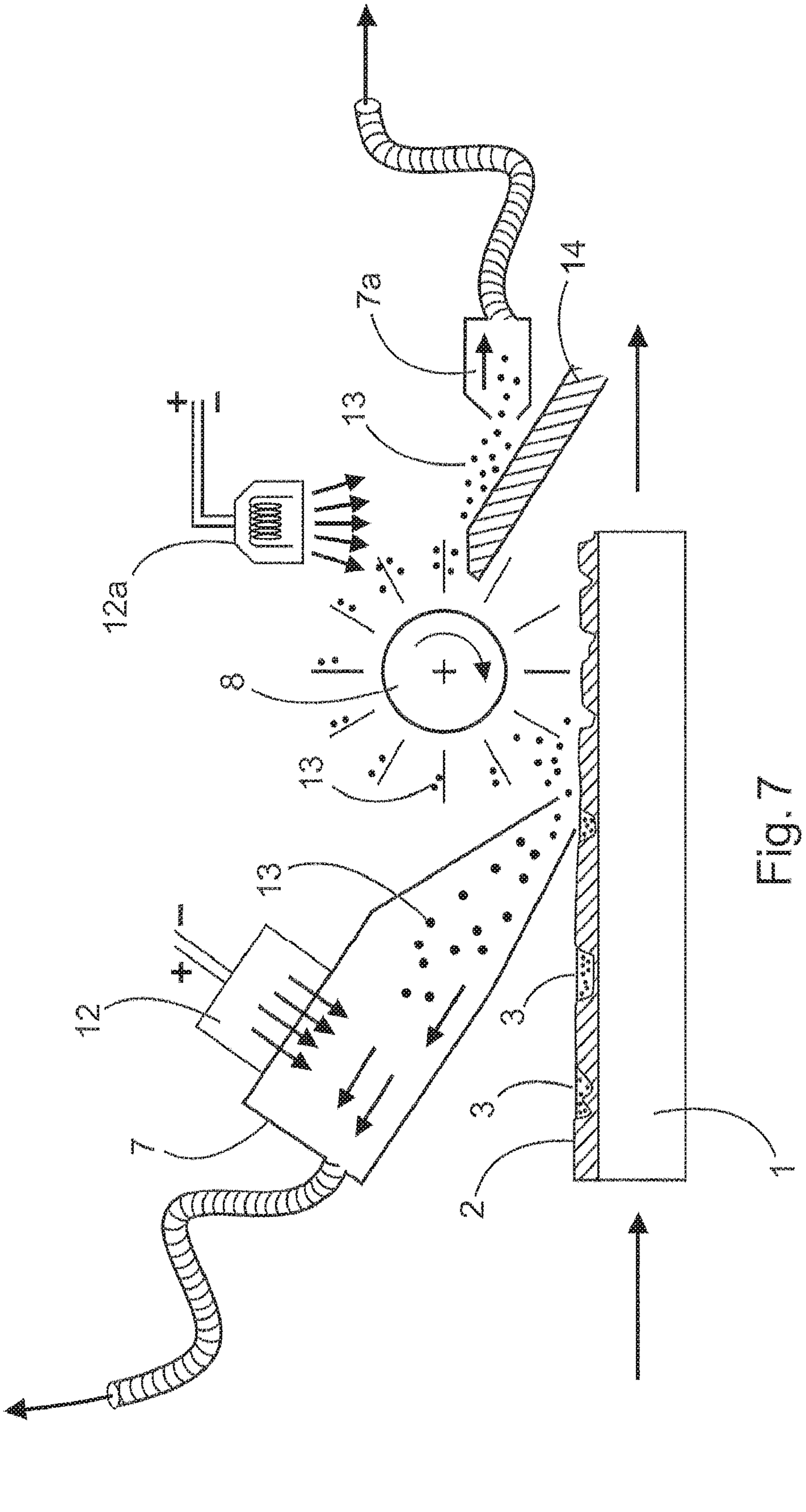
FIG. 7 shows a possibility to clean the contact element.

FIG. 7 shows a possibility for cleaning the contact element.

A flat workpiece 1 which, in the drawing, is moved from the left to the right is shown. The workpiece 1 is covered with a liquid layer 2 which forms the surface of the workpiece 1 after the complete curing. Into the liquid layer 2, a manipulation medium 3 has been inserted at some places in order to displace the liquid layer 2. The workpiece 1 is moved, for example, by a transport device of a device according to the invention.

In the direction of motion, first, a suction device 7 configured to suck up parts 13 of the layer 2, particularly the loosed manipulation medium 3, by vacuum is arranged.

Thereto, the suction nozzle of the suction device 7 is aligned close to the surface of the layer 2. After the suction device 7, a brush 8 designed as a roller brush is arranged. This brush 8 extends perpendicular to the drawing plane across the direction of motion of the workpiece 1. In this embodiment, the roller brush is rotated opposite to the direction of motion of the workpiece 1. Further, the suction device 7 comprises a radiation source 12. This radiation source 12 is configured to emit electromagnetic radiation, as UV radiation, for curing the sucked-up parts 13 of the layer 2, whereby a curing of the parts 13 takes place within the suction device 7 so that there is no risk that they adhere within the suction device 7 and clog it.

Apart from that, the functionality of the brush 8 as well as of the suction device 7 for removing the parts 13 of the layer 2, particularly of the manipulation medium 3, is identical to the functionality of the embodiment in FIG. 2.

For cleaning the contact element or the brush 8, a radiation source 12*a* emitting the UV radiation to the brush 8 and, thus, to the parts 13 of the layer 2 adhering on the bristles of the brush 8, wherein the parts 13 can comprise the material of the layer 2 and material of the manipulation medium 3, is here provided. In the rotary motion, the bristles of the brush 8 hit a stripper edge 14 after they have been irradiated by the radiation source 12*a*. The stripper edge 14 extends in the drawing downright and comprises a surface being formed such that parts 13 of the layer 2 which has been loosed from the bristles, are guided in direction of a suction device 7*a* located at this surface. The suction device 7*a* is configured to receive the loosed parts 13 of the layer 2 and to the suck them up by means of vacuum.

The functionality of the cleaning of the brush 8 presents as follows:

Within a cycle, i.e., within one rotation of the brush 8, the bristles of the brush 8 first hit onto the surface of the layer 2, whereby, here, parts 13 of the layer 2 are removed. Parts 13 which are loosed and which do not adhere in the bristles of the brush 8 are conveyed by the brush in direction of the suction device 7 which sucks them up by means of vacuum. Parts 13 adhered in the bristles of the brush 8 are irradiated by the radiation source 12*a* in the further course of the rotation of the brush 8, whereby they cure. The irradiation of the radiation source 12*a* can be as strong as the parts 13 adhered in the bristles of the brush 8 embrittle. Subsequently, the bristles hit onto the stripper edge 14, whereby a mechanical effect to these parts 13 is achieved. Due to that, the cured and/or embrittled parts 13 loose from the bristles of the brush 8, whereby they are conveyed by their removal speed and the formed surface of the stripper edge 14 to the suction device 7*a*. The suction device 7*a* finally sucks up these parts 13. The bristles of the brush 8 cleaned in such way are now available again for removing parts 13 of the layer 2 in a new cycle.

Figure 8:
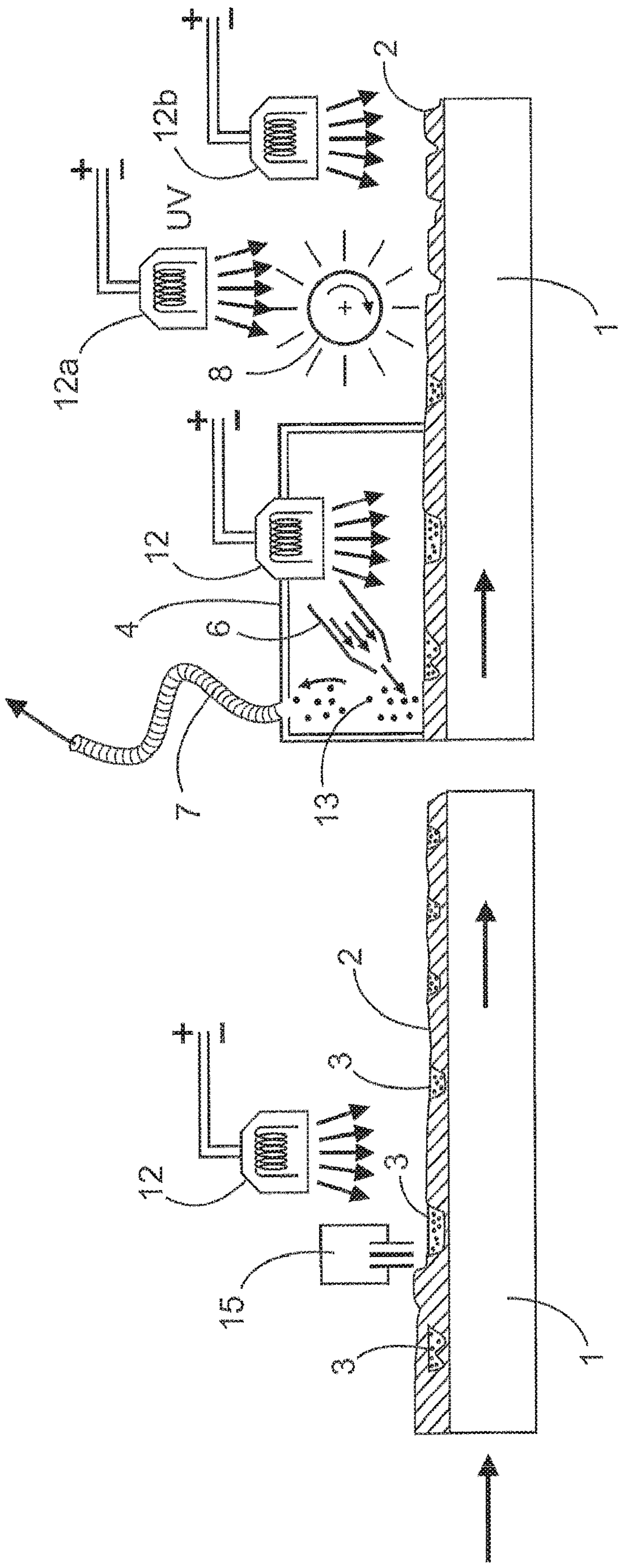
FIG. 8 shows a device in the form of a production line.

FIG. 8 shows a device in the form of a production line.

Two workpieces 1 which are moved one after another in the direction of motion from the left to the ride are shown. Thereto, a transport device (not shown) is provided. The workpiece 1 comprises a liquid layer 2 on its surface. In and/or on the layer 2, a manipulation medium 3 is included. In the direction of motion, following elements are arranged one after another from the left to the right. First, a stationary contact element in the form of a brush 15 which is configured to come into contact with the surface of the layer 2 in order to mechanically remove parts of the layer 2 is arranged. Thereby, it is here achieved that the manipulation medium 3 enclosed in the layer 2 is uncovered. After the brush 15, a radiation source 12 configured to emit UV radiation in the direction of the workpiece 1 or the layer 2 is arranged in order to at least partially cure the layer 2.

Subsequently in the direction of motion, an element comprising a chamber 4 through which the workpiece 1 is moved is provided. In the direction of motion, the chamber 4 first comprises a nozzle 6 emitting a fluid flow at an angle with respect to the surface of the layer 2 against the direction of motion of the workpiece 1. Thereby, the angle is maximum 90° or less. Preferably, an adaption of the angle between 0° and 30° is performed. This adaption can take place, for example, depending on the removed material of the manipulation medium and/or depending on the removed material of the layer 2. The fluid flow comprises solid bodies as described above in order to remove parts 13 of the layer 2. Further, the chamber comprises a suction device 7 configured to suck loosed parts 13 of the layer 2. Within the chamber, in the motion direction behind the nozzle 6, a radiation source 12 configured to irradiate the layer 2 with radiation in order to partially cure it is located so that the viscosity of the layer 2 changes. The radiation can, for example, be UV radiation with a wavelength of 200 to 400 nm.

In one embodiment, the fluid flow is configured such that it extends across the entire width of the workpiece 1, i.e., in a direction of extension of the workpiece 1 perpendicular to the drawing plane. In this way, it is ensured that all areas of the layer 2 are covered by the fluid flow.

A liquid or a gaseous substance is deployed as fluid. Specifically, also water and/or air can be deployed as fluid.

After the chamber 4, a contact element having a brush 8 in the form of a roller brush is arranged. The brush 8 is configured to mechanically remove parts of the layer 2. A radiation source 12*a*, for example, emitting UV radiation to the brush 8, is arranged above the brush 8 in order to cure the material of the parts of the layer 2 adhering to the bristles for cleaning the brush 8 in order to remove it out of the bristles, for example, at a stripper edge (not shown).

The cleaning of the brush 8 can basically take place according to the description to FIG. 7.

After the brush 8 in the direction of motion, a further radiation source 12*b* is arranged. This radiation source 12*b* emits, for example, UV radiation to the layer 2 and to a possibly requested included manipulation medium 3 in order to perform a final curing.

Figure 9:
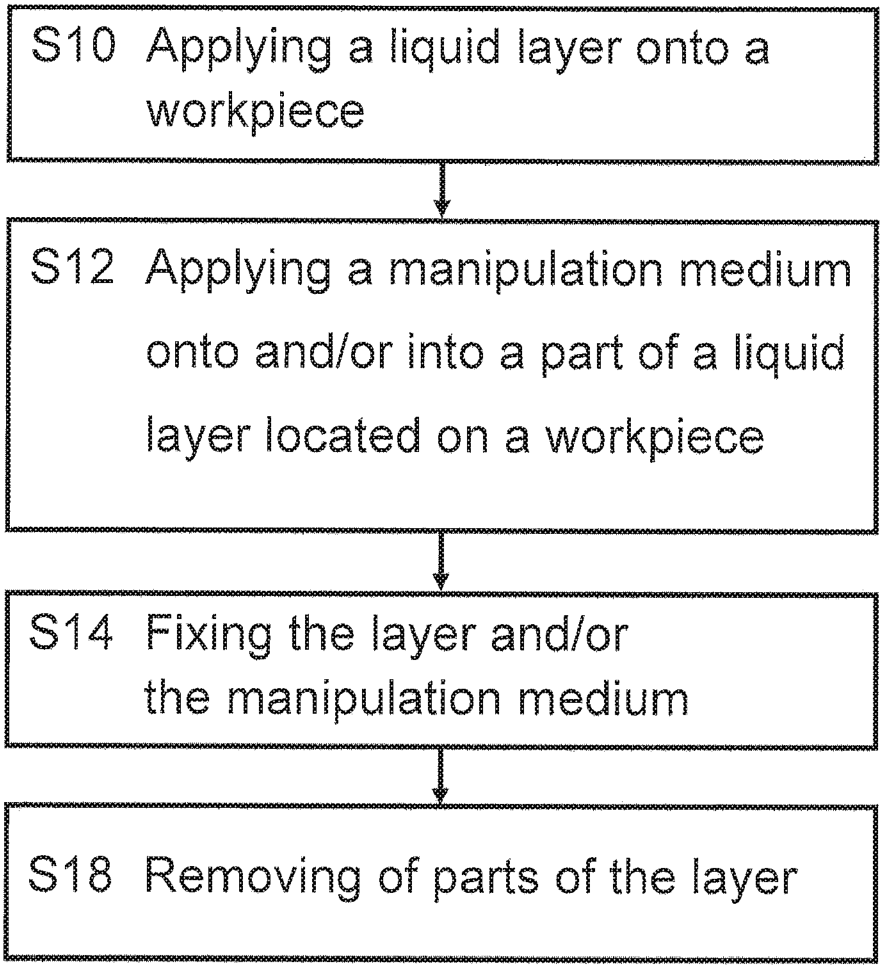
FIG. 9 shows an exemplary flowchart of the method.

FIG. 9 shows an exemplary flowchart of the method.

In step S10, a liquid layer is applied onto a workpiece, the liquid layer forming the surface of the workpiece in the cured state then. This can be performed, for example, by a digital or analog procedure.

In step S12, an application of a manipulation medium onto and/or into a part of the liquid layer located on a workpiece takes place. If step S12 is executed before step S10, a manipulation medium can also be applied to the workpiece, whereby, subsequently, step S10 is performed so that the manipulation medium is enclosed by the liquid layer.

In step S14, the fixing of the layer with the manipulation medium on the workpiece takes place. Alternatively, also, only the layer can be fixed.

In step S18, parts of the layer, also material of the manipulation medium can belong thereto, are removed. This ensues as described above.

The method can be further developed by interchanging, omitting and/or repeating of individual steps.

The invention is not limited to the embodiments shown here. Rather, further devices and/or methods also corresponding to the invention can be included by combining, interchanging or omitting individual features.

For example, the configuration of FIG. 7 can be supplementary integrated into the production line of FIG. 8 or can be provided instead of the chamber 4 and/or the brush 8 shown here.

Also, when in the FIGS. 2, 7, and 8, brushes 8 in the form of roller brushes are provided, supplementary or alternatively, the implementations of the brushes 8 of the FIGS. 3, 4, and 5 can be provided.

All of the nozzles 6 shown in the FIGS. 1 and 8 can be configured to emit a fluid flow with or without solid bodies as described above. The fluid flow can include a gas and/or a liquid, wherein it especially includes air and/or water.

The radiation sources shown in all of the figures can be configured to, alternatively or additionally to the electromagnetic radiation, particularly UV radiation, also emit another radiation, as, e.g., electron radiation. The kind of radiation and/or the respective wavelength is thereby selected depending on the composition of the material of the layer 2 and/or of the manipulation medium 3 and/or depending on the desired effect of the radiation to layer 2 and/or the manipulation medium 3. Thus, for a complete curing, another wavelength and/or radiation can be deployed than if merely the viscosity of layer 2 shall be changed in a previous step in order to, for example, prevent a blurring of the recesses inserted by the manipulation medium 3.

All of the here-shown embodiments of the invention which at least comprise a brush 8 can further be configured such that the at least one brush 8 is provided movably.

Thereby, it is to be understood that the at least one brush 8 can be actively moved in a predefined motion pattern. Therefore, for example, a disc brush can be provided at a rotatable suspension.

LIST OF REFERENCE SIGNS

1 workpiece
1*a* connection element
2 layer
3 manipulation medium
4 chamber
5 curing device
6 nozzle
7 suction device
7*a* suction device
8 brush
9 direction of rotation
10 circulation direction
11 beam
12 radiation source
12*a* radiation source
12*b* radiation source
13 loosed parts of layer 2
14 stripper edge
15 contact element
S10 application of a liquid layer
S12 application of a manipulation medium
S14 fixation of the layer
S18 removal of parts of the layer

What is claimed is:

1. A method for producing a decorative surface on a workpiece, comprising:

I. applying a manipulation medium into or onto at least a part of a liquid layer located on the workpiece, wherein the applying is:

I.a (I.a1) onto the part of the liquid layer located on the workpiece, wherein when the manipulation medium is applied at least onto the part of the liquid layer, the manipulation medium is configured for at least one of: displacing a portion of the liquid layer in relation to the workpiece; and at least partially absorbing incident electromagnetic radiation; and (I.a2) into the part of the liquid layer located on the workpiece, wherein when the manipulation medium is applied at least into the part of the liquid layer, the manipulation medium is configured for at least one of displacing a portion of the liquid layer in relation to the workpiece and at least partially absorbing incident electromagnetic radiation, or (I.a3) at least onto a part of the workpiece, wherein when the manipulation medium is applied at least onto the part of the workpiece, the manipulation medium is configured for at least one of displacing a portion of the liquid layer in relation to the workpiece and at least partially absorbing incident electromagnetic radiation, or I.b. onto a part of the workpiece, wherein when the manipulation medium is applied at least onto the part of the workpiece the manipulation medium functions as placeholder so that regions of the surface of the workpiece do not come in contact to the liquid layer;

II. curing at least one of the liquid layer and the manipulation medium by the electromagnetic radiation at least until a partial curing resulting in a partially cured structure comprising at least one of the partially cured liquid layer and the partially cured manipulation medium;

III. removal of parts of the partially cured structure to create at least one of a remaining partially cured liquid layer and a remaining manipulation medium, wherein the removal takes place in at least one of a mechanical manner and a contactless manner, wherein the removal includes a heating of at least one of the partially cured structure and the manipulation medium after the curing by supplying heat for at least partial liquefaction of the parts; and—curing at least one of the remaining partially cured liquid layer and the remaining manipulation medium after the removal until a final curing.

2. The method according to claim 1, wherein the parts of the partially cured structure also include parts of the manipulation medium located on or in the partially cured structure or exclusively consist of the manipulation medium.

3. The method according to claim 1, wherein the removal takes place mechanically by means of a removal device comprising a contact element being in contact with the surface of the partially cured structure, wherein the surface of the partially cured structure and the contact element move relative to each other during the removal.

4. The method according to claim 3, wherein the contact element comprises a stationary and/or movable brush and/or a grinding element and/or a plane element, wherein the brush comprises, at least as the movable brush, a disc brush and/or a roller brush and/or a brush band and/or, as the stationary brush, a beam with a brush trimming, and/or wherein the brush, comprises bristles made of at least one of textile, plastic fibers, metal, brass, and copper.

5. The method according to claim 3, wherein a step of cleaning the contact element is executed.

6. The method according to claim 1, wherein the removal includes a suction of the parts by vacuum provided by a suction device.

7. The method according to claim 1, wherein the removal includes at least one of a streaming to the surface of the partially cured structure and a streaming to the manipulation medium by a fluid flow.

8. The method according to claim 7, wherein the fluid flow impinges onto at least one of the surface of the partially cured structure and the manipulation medium so that the fluid flow extends across the entire width of the partially cured structure, and/or wherein the fluid flow impinges onto at least one of the partially cured structure and the manipulation medium at an angle which is less than 30°.

9. The method according to claim 7, wherein the fluid flow comprises solid bodies having a diameter of 0.0001 to 1 mm and/or which are configured to liquefy or to evaporate after the impinging onto the partially cured structure and/or which are supplied by a liquid when emitted.

10. The method according to claim 1, comprising at least one of the following steps:

applying a liquid layer onto at least one of at least a part of a surface of the workpiece and a manipulation medium applied onto the surface of the workpiece.

11. The method according to claim 10, wherein the curing includes an irradiation of at least one of the liquid layer and/or of the manipulation medium by at least one of electromagnetic radiation and an irradiation by electron radiation, and/or wherein the curing includes at least one of an active drying, a passive drying and/or a reaction curing and/or wherein the curing is performed until to the final curing of the partially cured structure after the removal.

12. The method according to claim 10, wherein the manipulation medium and the liquid layer are configured such that they do not coalesce to each other during the curing.

* * * * *